United States Patent
Luciano, Jr. et al.

(10) Patent No.: US 9,643,056 B2
(45) Date of Patent: May 9, 2017

(54) GOLF BALL WITH RFID INLAY BETWEEN A SPLIT CORE

(75) Inventors: Robert Luciano, Jr., Reno, NV (US); Warren White, Reno, NV (US); David Grieshaber, Brisbane, CA (US)

(73) Assignee: EDGE TECHNOLOGY, Reno, NV (US)

( * ) Notice: Subject to any disclaimer, the term of this patent is extended or adjusted under 35 U.S.C. 154(b) by 119 days.

(21) Appl. No.: 13/444,660

(22) Filed: Apr. 11, 2012

(65) Prior Publication Data

US 2012/0255998 A1    Oct. 11, 2012

Related U.S. Application Data

(63) Continuation-in-part of application No. 13/277,940, filed on Oct. 20, 2011, which is a continuation-in-part of application No. 13/212,850, filed on Aug. 18, 2011, now Pat. No. 8,866,613, and a
(Continued)

(51) Int. Cl.
| | | |
|---|---|---|
| *G08B 13/14* | (2006.01) | |
| *A63B 37/00* | (2006.01) | |
| *A63B 43/00* | (2006.01) | |
| *B29C 43/02* | (2006.01) | |
| *A63B 24/00* | (2006.01) | |
| *B29C 43/18* | (2006.01) | |

(52) U.S. Cl.
CPC .......... *A63B 37/0003* (2013.01); *A63B 43/00* (2013.01); *B29C 43/027* (2013.01); *A63B 2024/0037* (2013.01); *A63B 2220/10* (2013.01); *A63B 2225/15* (2013.01); *A63B 2225/54* (2013.01); *B29C 43/18* (2013.01)

(58) Field of Classification Search
CPC .............. G06K 7/0008; G06K 19/0723; A63B 2055/001; A63B 37/0003; A63B 43/00; B29C 43/027; B29C 43/18
USPC ................ 473/150, 151; 463/30, 31, 35, 37; 345/700, 873; 340/572.8
See application file for complete search history.

(56) References Cited

U.S. PATENT DOCUMENTS

| | | |
|---|---|---|
| 3,369,812 A | 2/1968 | McKee |
| 3,828,353 A | 8/1974 | Majkrzak et al. |
| 3,889,957 A | 6/1975 | Klabacka |

(Continued)

FOREIGN PATENT DOCUMENTS

| | | |
|---|---|---|
| GB | 2446212 A | 6/2006 |
| JP | 8224331 | 9/1996 |
| JP | 2013154176 A | 8/2013 |

*Primary Examiner* — Eric M Blount
(74) *Attorney, Agent, or Firm* — Kerr IP Group, LLC

(57) ABSTRACT

A compressible core with an RFID tag is described. The compressible core comprises an RFID integrated circuit, and an inlay material sandwiched between a top hemisphere and a bottom hemisphere. The RFID integrated circuit includes a memory that stores a unique identifier. The inlay material includes an RFID antenna electrically coupled to the RFID integrated circuit. The top hemisphere of the compressible core is separated from the bottom hemisphere of the compressible core. The inlay with the RFID antenna and the RFID integrated circuit placed between the top and bottom hemispheres. The top hemisphere, the inlay and the bottom hemisphere are joined together forming a compressible core. Additionally, the molded shell encapsulates the compressible core.

7 Claims, 15 Drawing Sheets

Related U.S. Application Data continuation-in-part of application No. 13/212,885, filed on Aug. 18, 2011, now Pat. No. 9,035,749.

(60) Provisional application No. 61/374,713, filed on Aug. 18, 2010, provisional application No. 61/375,555, filed on Aug. 20, 2010.

(56) References Cited

U.S. PATENT DOCUMENTS

| | | | |
|---|---|---|---|
| 4,816,836 A | 3/1989 | Lalezari | |
| 4,979,739 A | 12/1990 | Allen et al. | |
| 5,102,140 A | 4/1992 | Vincent | |
| 5,114,155 A | 5/1992 | Tillery et al. | |
| 5,370,389 A | 12/1994 | Reising | |
| 5,439,224 A | 8/1995 | Bertoncino | |
| 5,505,457 A | 4/1996 | Boylan et al. | |
| 5,513,841 A | 5/1996 | Takagi | |
| 5,626,531 A | 5/1997 | Little | |
| 5,674,130 A | 10/1997 | Egan | |
| 5,743,815 A * | 4/1998 | Helderman | A63B 37/0003 473/152 |
| 5,821,525 A | 10/1998 | Takebayashi | |
| 5,910,057 A | 6/1999 | Quimby et al. | |
| 5,949,679 A | 9/1999 | Born et al. | |
| 6,148,271 A | 11/2000 | Marinelli | |
| 6,322,455 B1 | 11/2001 | Howey | |
| 6,569,028 B1 | 5/2003 | Nichols et al. | |
| 6,607,123 B1 | 8/2003 | Jollifee et al. | |
| 6,620,057 B1 | 9/2003 | Pirritano et al. | |
| 6,705,942 B1 * | 3/2004 | Crook et al. | 463/3 |
| 6,974,391 B2 | 12/2005 | Ainsworth et al. | |
| 6,998,965 B1 | 2/2006 | Luciano et al. | |
| 7,040,998 B2 | 5/2006 | Jolliffe et al. | |
| 7,052,391 B1 | 5/2006 | Luciano | |
| 7,056,221 B2 | 6/2006 | Thirkettle et al. | |
| 7,059,974 B1 * | 6/2006 | Golliffe | A63B 37/0003 473/351 |
| 7,160,196 B2 | 1/2007 | Thirkettle et al. | |
| 7,315,253 B1 * | 1/2008 | Pijanowski | G08B 13/2434 340/572.8 |
| 7,337,965 B2 | 3/2008 | Thirkettle et al. | |
| 7,540,428 B2 | 6/2009 | Baba et al. | |
| 7,691,009 B2 * | 4/2010 | Savarese | A63B 24/0021 473/152 |
| 7,714,965 B2 | 5/2010 | Chien et al. | |
| 7,766,766 B2 * | 8/2010 | Savarese | A63B 24/0021 473/351 |
| 7,791,982 B2 | 9/2010 | Karr | |
| 7,843,334 B2 | 11/2010 | Kumagai et al. | |
| 8,120,540 B1 * | 2/2012 | Armstrong | G06K 7/10336 235/492 |
| 8,866,613 B2 | 10/2014 | Luciano | |
| 8,882,606 B2 | 11/2014 | Leech et al. | |
| 9,035,749 B2 | 5/2015 | Luciano | |
| 9,339,697 B2 | 5/2016 | Luciano et al. | |
| 9,339,715 B2 | 5/2016 | Luciano et al. | |
| 2002/0065567 A1 | 5/2002 | Kodera | |
| 2003/0004005 A1 | 1/2003 | Ainsworth et al. | |
| 2003/0085619 A1 | 5/2003 | Strache et al. | |
| 2003/0191547 A1 | 10/2003 | Morse | |
| 2004/0142766 A1 | 7/2004 | Savarese et al. | |
| 2004/0214648 A1 | 10/2004 | Simpson | |
| 2004/0243262 A1 * | 12/2004 | Hofmann | 700/91 |
| 2005/0051951 A1 | 3/2005 | Benevento | |
| 2005/0070376 A1 | 3/2005 | Savarese et al. | |
| 2005/0227792 A1 | 10/2005 | McCreary et al. | |
| 2005/0272496 A1 | 12/2005 | Reinish et al. | |
| 2005/0282650 A1 | 12/2005 | Miettinen et al. | |
| 2006/0038730 A1 * | 2/2006 | Parsche | H01Q 7/04 343/741 |
| 2006/0105857 A1 | 5/2006 | Stark | |
| 2006/0122007 A1 | 6/2006 | Savarese et al. | |
| 2007/0026968 A1 | 2/2007 | Ratcliffe | |
| 2007/0167247 A1 | 7/2007 | Lindsay | |
| 2007/0241987 A1 * | 10/2007 | Kish | H01Q 1/2241 343/897 |
| 2007/0259740 A1 | 11/2007 | Savarese et al. | |
| 2008/0000364 A1 | 1/2008 | Bevirt | |
| 2008/0021651 A1 | 1/2008 | Seeley et al. | |
| 2008/0158072 A1 | 7/2008 | Logan et al. | |
| 2008/0207357 A1 | 8/2008 | Savarese et al. | |
| 2009/0017944 A1 | 1/2009 | Savarese et al. | |
| 2009/0052618 A1 * | 2/2009 | Homanfar et al. | 378/38 |
| 2009/0253526 A1 | 10/2009 | Koudele et al. | |
| 2009/0294528 A1 | 12/2009 | Halbur | |
| 2009/0314423 A1 | 12/2009 | Savarese et al. | |
| 2010/0201512 A1 * | 8/2010 | Stirling et al. | 340/539.11 |
| 2010/0304876 A1 | 12/2010 | Hohla et al. | |
| 2010/0328038 A1 | 12/2010 | Kato | |
| 2011/0201437 A1 | 8/2011 | Fallow et al. | |
| 2012/0052967 A1 | 3/2012 | Grieshaber et al. | |
| 2012/0096358 A1 * | 4/2012 | Barnes, Jr. | 715/728 |
| 2012/0205452 A1 * | 8/2012 | Rofougaran | 235/492 |
| 2012/0208638 A1 * | 8/2012 | Barney et al. | 463/31 |
| 2012/0255998 A1 | 10/2012 | Luciano et al. | |
| 2012/0255999 A1 | 10/2012 | Luciano et al. | |
| 2012/0256731 A1 | 10/2012 | Luciano et al. | |
| 2013/0023210 A1 * | 1/2013 | Rofougaran | 455/41.1 |
| 2013/0165261 A1 | 6/2013 | Luciano et al. | |
| 2013/0196787 A1 | 8/2013 | Luciano et al. | |
| 2013/0196788 A1 | 8/2013 | Shimizu et al. | |

* cited by examiner

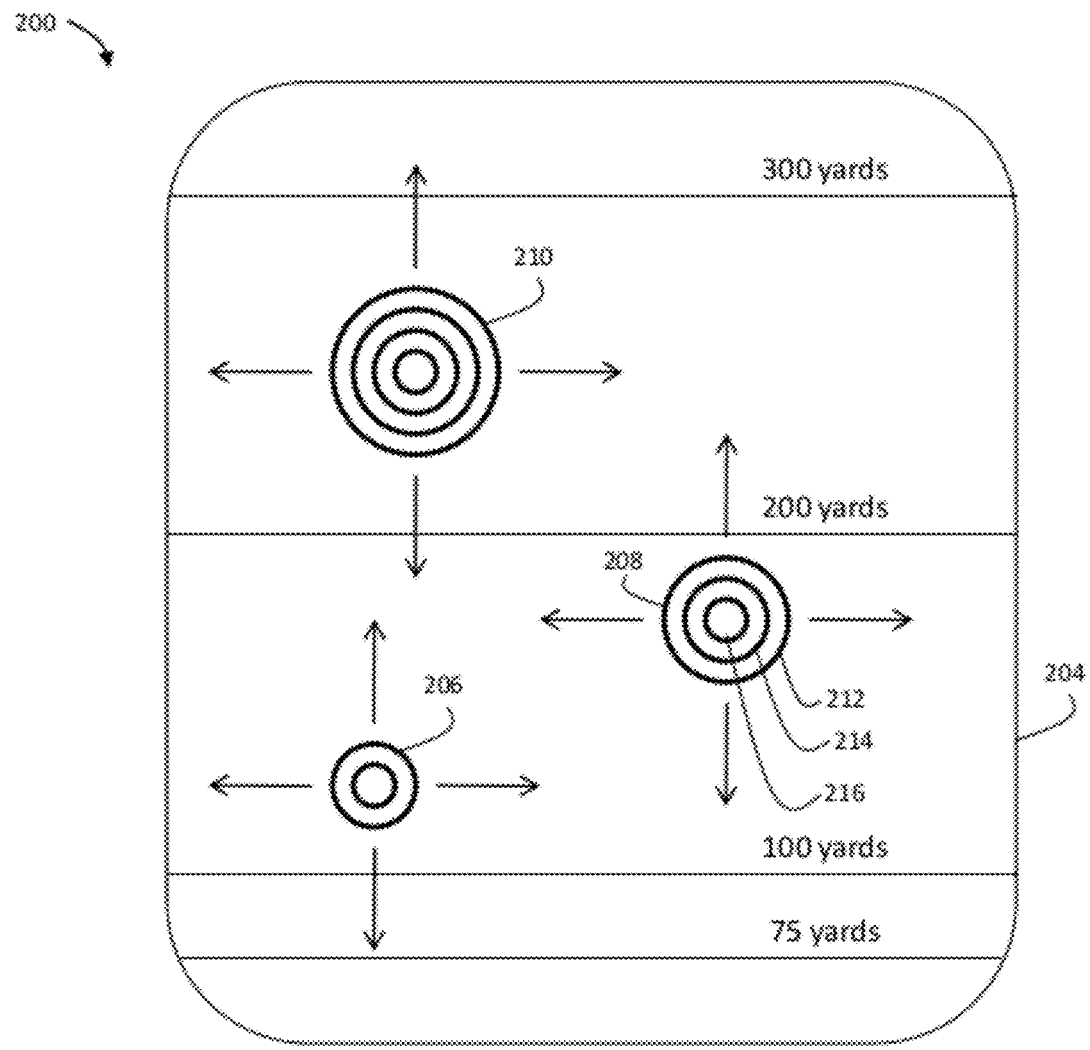
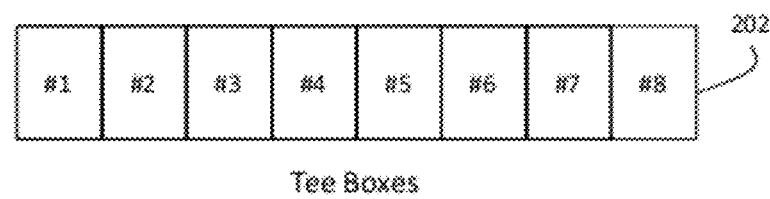
Figure 6

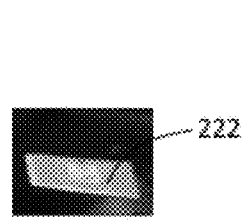
Figure 7A
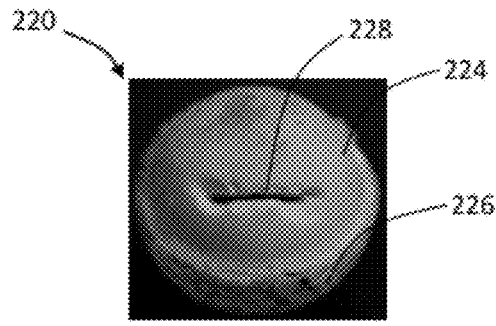
Figure 7B
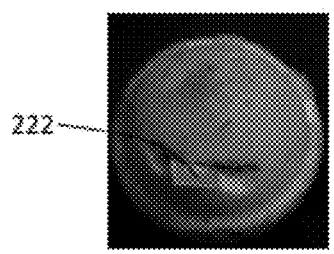
Figure 7C
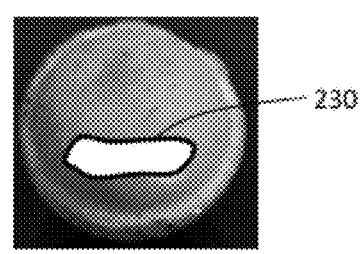
Figure 7D
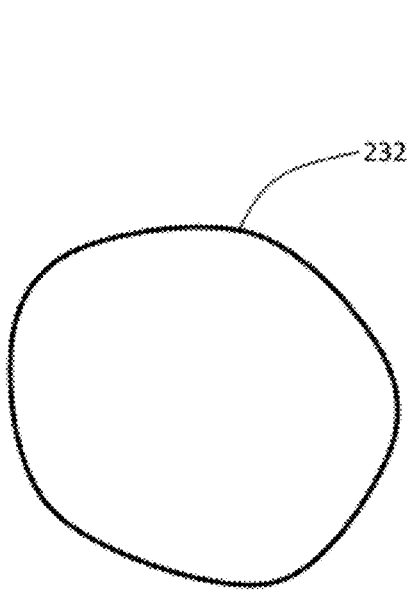
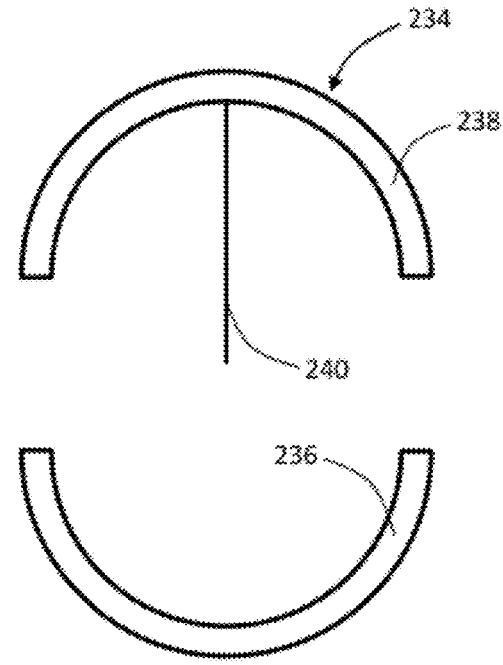
Figure 7E

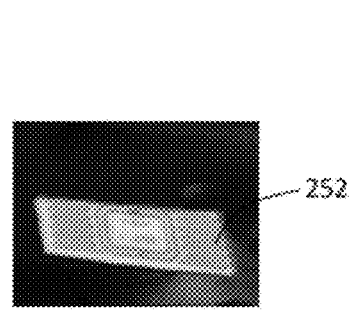
Figure 8A
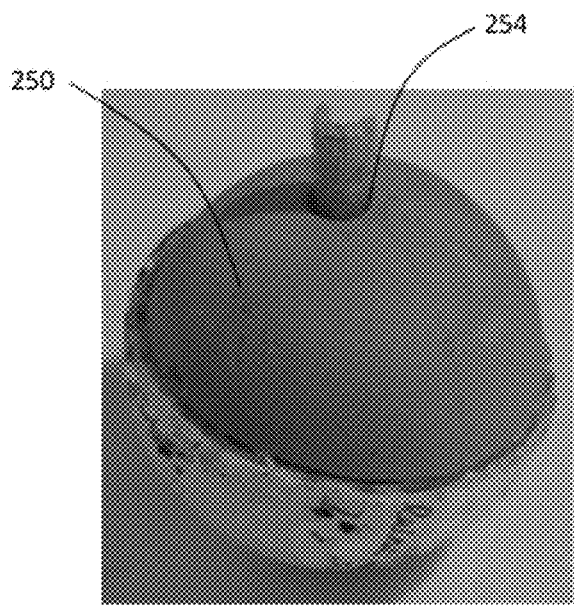
Figure 8B
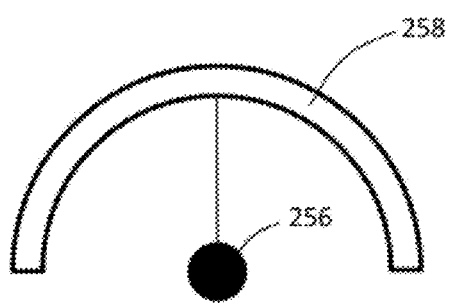
Figure 8C
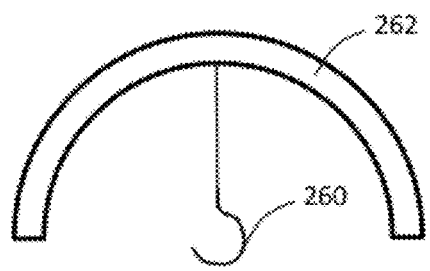
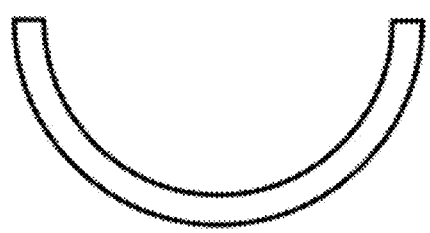
Figure 8D

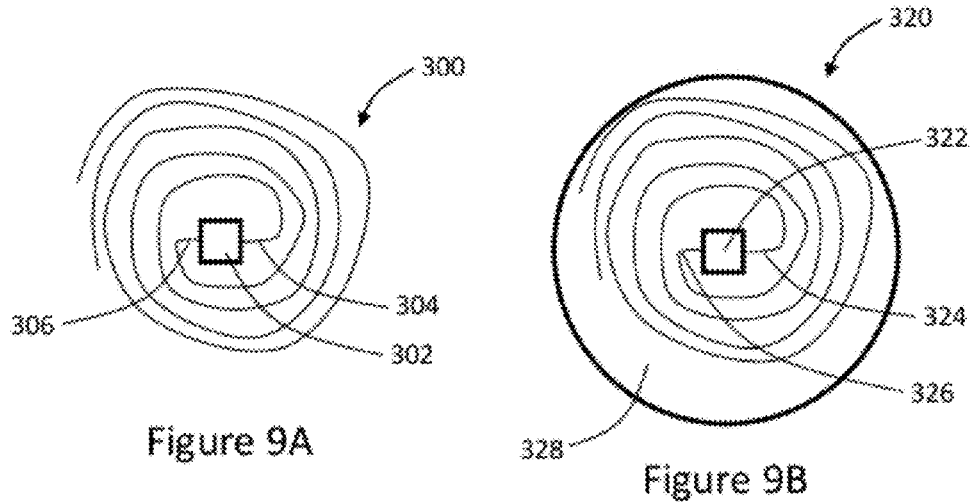
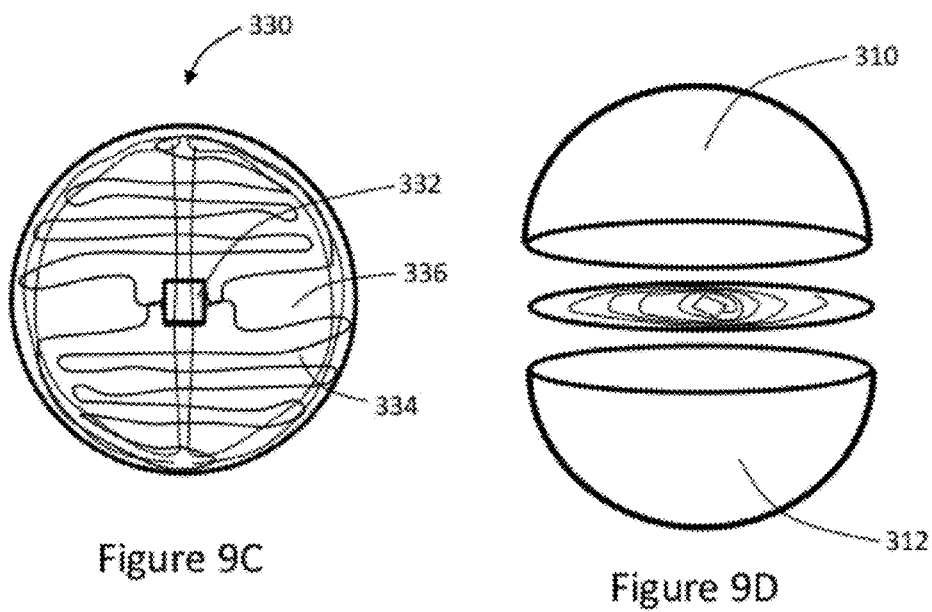

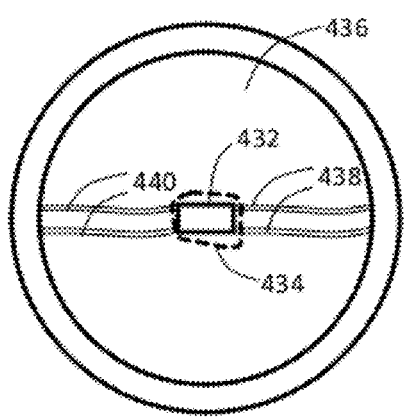
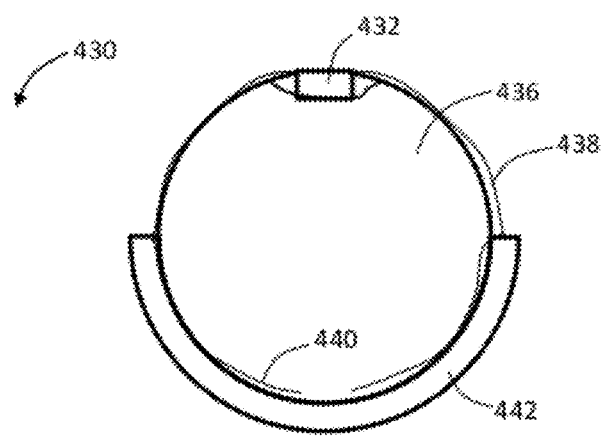
Figure 11A    Figure 11B
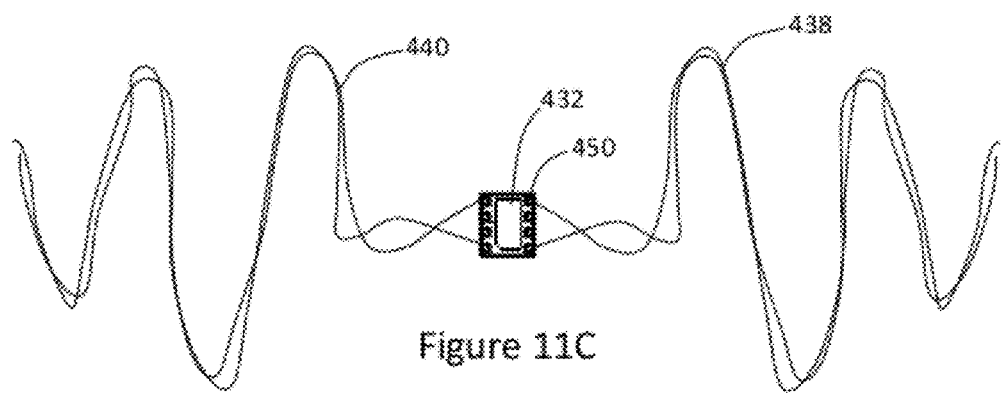
Figure 11C
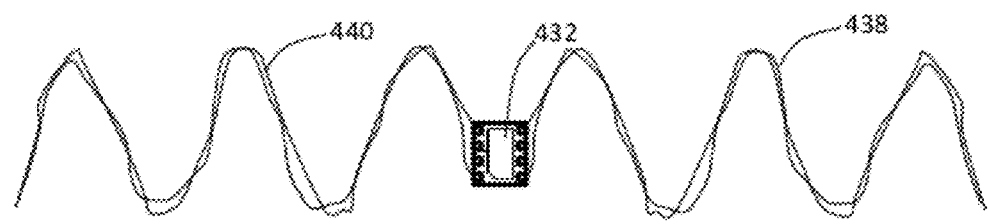
Figure 11D

GOLF BALL WITH RFID INLAY BETWEEN A SPLIT CORE

CROSS REFERENCE

This patent application is a continuation-in-part of Ser. No. 13/277,940 filed on Oct. 20, 2011 and entitled RFID GOLF BALL TARGET SYSTEM AND METHOD which is a continuation-in-part of Utility patent application Ser. No. 13/212,850 filed on Aug. 18, 2011 now U.S. Pat. No. 8,866,613 and entitled BALL SEPARATION DEVICE FOR A GOLF RANGE TARGET and is a continuation-in-part of Utility patent application Ser. No. 13/212,885 filed on Aug. 18, 2011 now U.S. Pat No. 9,035,749 and entitled MOVABLE GOLF RANGE TARGET WITH RFID BALL IDENTIFIER; and both patent applications claim the benefit of provisional patent application 61/374,713 filed on Aug. 18, 2010 and entitled MOVABLE GOLF RANGE TARGET WITH RFID BALL IDENTIFIER and claims benefit of provisional patent application 61/375,555 filed on Aug. 20, 2010 and entitled BALL SEPARATION DEVICE FOR A GOLF RANGE TARGET. All patent applications identified above are hereby incorporated by reference.

FIELD

The present invention relates to a golf ball with an RFID tag received by a compressible core that has a molded impression. More particularly, the invention is related to an RFID golf ball that includes a specially molded core that receives the RFID tag.

The present invention relates to a golf ball with an RFID tag between split core. More particularly, the invention is related to splitting the core of a golf ball and then sandwiching an RFID tag between the top hemisphere and bottom hemisphere.

The present invention relates to a golf ball with an encapsulated RFID chip. More particularly, the invention is related to an RFID golf ball that includes an encapsulated RFID chip having contact pads that are electrically coupled to an antenna, which are received by a specially molded core, and a target system and method that identifies golf balls in games of skill, games of chance, and any combination thereof.

BACKGROUND

Radio Frequency Identification (RFID) tags contain at least two parts: first, an integrated circuit for storing and processing information, modulating and demodulating a radio-frequency (RF) signal, collecting DC power from the incident reader signal, and other specialized functions; and second, an antenna for receiving and transmitting the signal.

Radio Frequency Identification (RFID) tags are capable of uniquely identifying an object via a pre-programmed response when queried by an external radio frequency wave. However, not all RFID tags are the same, as some are equipped with a transponder ID (TID) by the manufacturer. This TID is usually written to a chip at the point of manufacture, and not alterable. Additionally, some ultra-high-frequency (UHF) tags can store a 64-bit, 96-bit or 128-bit serial number. These can be read-only or read/write. Others also have blocks of user memory that can be written to and locked, or rewritten over and over.

Signaling between the reader and the tag is done in several different incompatible ways, depending on the frequency band used by the tag. Tags operating on LF and HF frequencies are, in terms of radio wavelength, very close to the reader antenna; less than one wavelength away. In this near field region, the tag is closely coupled electrically with the transmitter in the reader. The tag can modulate the field produced by the reader by changing the electrical loading the tag represents. By switching between lower and higher relative loads, the tag produces a change that the reader can detect. At UHF and higher frequencies, the tag is more than one radio wavelength from the reader and it can backscatter a signal. Active tags may contain functionally separated transmitters and receivers, and the tag need not respond on a frequency related to the reader's interrogation signal.

An RFID system uses RFID tags that are attached to the objects to be identified. In operation, an RFID reader sends a signal to the tag and reads its response. The readers generally transmit their observations to a computer system running RFID software or RFID middleware.

The RFID tag's information is stored electronically in a non-volatile memory. The RFID tag includes a small RF transmitter and receiver. The RFID reader transmits a radio signal to interrogate the tag. The RFID tag receives the message and responds with its identification information.

RFID tags can be passive or active. Tags may either be read-only, having a factory-assigned serial number that is used as a key into a database, or may be read/write, where object-specific data can be written into the tag by the system user.

Although RFID tags have been used in golf balls previously, there continues to be problems with separation between the antenna portion and the RFID integrated circuit. When the RFID antenna is separated from the RFID integrated circuit, the RFID golf ball cannot be read. Additionally, RFID golf balls appear to have a noticeably different trajectory when struck than a standard golf ball.

SUMMARY

A compressible core with an RFID tag is described. The compressible core comprises an RFID integrated circuit, a carrier material sandwiched between a compressible material that is split into two sections. The RFID integrated circuit includes a memory that stores a unique identifier. The carrier material is configured to receive the RFID integrated circuit. The RFID antenna is electrically coupled to the RFID integrated circuit and the RFID antenna is disposed on the carrier material. The compressible material is split into two sections. The carrier material with the RFID antenna and the RFID integrated circuit is placed between the two sections, that are then joined together forming a compressible core. Additionally, the molded shell encapsulates the compressible core.

In one embodiment, the RFID antenna is electrically coupled to the RFID integrated circuit with a conductive material. In another embodiment, the RFID antenna is electrically coupled to the RFID integrated circuit with a non-conductive adhesive.

In one embodiment, the compressible material comprises a slug that is placed into a mold, which is then heated to form the compressible cores. In another embodiment, the compressible material comprises a spherical core that has been split into a top hemisphere and a bottom hemisphere, wherein the carrier material is sandwiched between the hemispheres and is then placed in a mold that joins the top hemisphere, the carrier material, and the bottom hemisphere. In yet another embodiment, the RFID antenna includes a conductive wire electrically coupled to the RFID integrated circuit.

An RFID ball reading system is also described. The system comprises an RFID reader and an RFID golf ball. The RFID golf ball includes an RFID integrated circuit, an inlay material, a carrier material sandwiched between a compressible material split in two sections, and a molded shell. The RFID integrated circuit includes a memory that stores a unique identifier. The carrier material receives the RFID integrated circuit. The RFID antenna is electrically coupled to the RFID integrated circuit and the RFID antenna is also disposed on the carrier material. The compressible material is split into two sections and the carrier material is placed between the split sections that are subsequently joined to form a compressible core. The molded shell encapsulates the molded compressible core.

In one embodiment, the RFID reader of the RFID ball reading system includes an RFID reader antenna that is disposed above ground along a vertical plane. In another embodiment, the RFID reader includes an RFID reader antenna that is disposed along a horizontal plane.

In the illustrative embodiment, each RFID reader is communicatively coupled to a plurality of antennas that correspond to a particular golf driving bay. Additionally, RFID readers are networked and communicate RFID data to a central database.

In one embodiment, the RFID antenna is electrically coupled to the RFID circuit with a conductive material. In yet another embodiment, the RFID antenna is electrically coupled to the RFID circuit with a non-conductive adhesive.

A method for embedding an RFID tag into a compressible core is also described. The method includes splitting a compressible material into two sections and then placing a carrier material, that includes an RFID antenna electrically coupled to the RFID integrated circuit, between the two sections of the compressible material The RFID integrated circuit includes a memory configured to store at least one unique identifier. The method proceeds to join the carrier material that is sandwiched between the two section with a mold. The mold is removed and the molded compressible core includes the RFID tag. The molded compressible core is encapsulated with a molded shell.

In one embodiment, the compressible core comprises a split slug that is placed into the mold which is then heated to form a compressible core. In another embodiment, the compressible material comprises a spherical core that has been split into a top hemisphere and a bottom hemisphere, wherein the carrier material is sandwiched between the hemispheres and is then placed in a mold this is then heated to join the hemispheres and carrier.

FIGURES

The illustrative embodiment will be more fully understood by reference to the following drawings which are for illustrative, not limiting, purposes.

FIG. 6 shows an illustrative driving range having movable targets.

FIGS. 7A-7D show a planar molded impression in a compressible core that receives an RFID tag composed on an inlay material.

FIG. 7E shows the mold used to generate the planar molded impression.

FIGS. 8A-8B show a curved molded impression in a compressible core that receives an RFID inlay material.

FIGS. 8C and 8D show the mold used to generate the curved molded impression.

FIGS. 9A-9D show an RFID tag sandwich between a split core.

FIGS. 11A-11F show different antenna that are electrically coupled to an RFID integrated circuit disposed on a molded impression at the surface of the compressible core.

Figure 13:
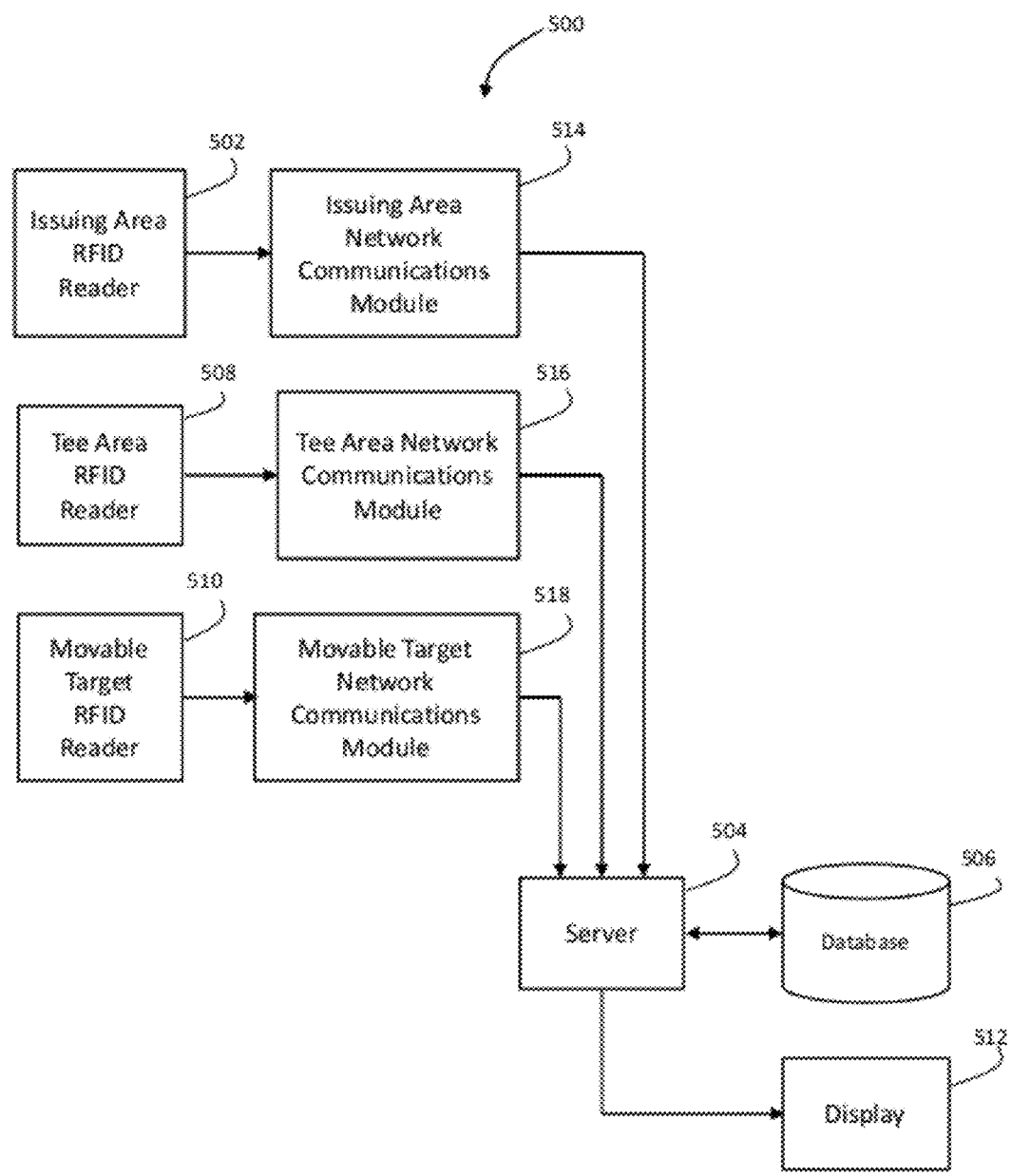

FIG. 13 presents an illustrative system diagram of the golf range target system.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the RFID golf ball systems and methods described hereinafter may vary as to configuration and as to details.

Although RFID tags have been used in golf balls previously, there continue to be problems with separation between the antenna portion and the RFID integrated circuit. When the RFID antenna is separated from the RFID integrated circuit, the RFID golf ball cannot be read. Additionally, RFID golf balls appear to have a noticeably different trajectory than a standard golf ball when struck. The amount of ball flex in a golf ball is estimated to be 0.2 inches during impact, and this impact causes separation between the antenna portion and the RFID integrated circuit, creating an RFID golf ball that cannot be read.

A variety of different RFID golf ball embodiments are presented herein including compressible core with a carrier material having an RFID integrated circuit and antenna, or an encapsulated RFID integrated circuit with conductive wires as antennas. Additionally, RFID golf ball systems and methods are presented. Furthermore, RFID golf ball reader systems are described herein.

For purposes of this patent application, the terms RFID "integrated circuit" is interchange with the term "chip." As described below, the RFID integrated circuit or chip includes a memory that stores at least one unique identifier. The term "identifier" refers to identification numbers or letters or symbols or any combination thereof.

The RFID integrated circuit may be encapsulated in a rigid or elastic material. As described in further detail, the encapsulated RFID integrated circuit includes exposed contact pads that are electrically coupled to an antenna. Illustrative materials for the rigid or elastic encapsulated RFID integrated circuit include an epoxy resin or silicon-based compound, respectively.

Additionally, term "antenna" as used herein refers to either an RFID antenna or an RFID reader antenna. Additionally, the term "antenna" is sometimes used interchangeably with materials that function as an antenna such as "conductive wires" or "conductive ink". The conductive wires or conductive ink is placed on the surface or in the center of the compressible cores.

Conductive wires operate as antennas for the encapsulated RFID integrated circuit described herein. Generally, the conductive wires are electrically coupled to the encapsulated RFID circuit with a solder that joins the surface of the contact pad and the surface of the conductive wire. By way of example and not of limitations, the material properties of the solder may include tin, lead, silver or any combination thereof, Sometimes reference is made to an "RFID tag." The RFID tag includes both a chip and an antenna. The RFID tag may also be referred to as an "RFID inlay" or and "RFID inlay tag"

The RFID tag may also include a "carrier" or "substrate," on which the chip and antenna are disposed. The carrier or substrate may include an adhesive or may not include an adhesive.

Reference is also made to a compressible core. The term "compressible" refers to the ability of the core to be "compressed" when struck by a golf club. The term "compressible" is thus descriptive and does not depart from the fundamental material properties corresponding to or associated with the "compressible core." For example, basic concepts of stress, strain, and elastic modulus are applicable to the compressible core and its precursor, the "slug." The term "slug" refers to a pillow-shaped material that is placed inside a mold that after heating produces the compressible core. A compressible core may also be subject to stress such as tensile stress, bulk stress, and shear stress. Additionally, the terminology of "compressed" or "compressible" is also similar to "flexible," and so these terms are also used interchangeably in this patent application The "mold" described herein imparts a predominantly spherical shape to the slug material. The compressible core is primarily spherical in shape, but is also shaped to accommodate receiving the RFID chip, RFID antenna, the carrier material and any other encapsulation materials. Thus, the various configurations of RFID chip and RFID antenna can result in a customized mold. Any gaps or spaces in the customized mold impression may be filled with a fill material. The fill material has material properties similar to the compressible core.

A molded shell is also presented herein as the dimpled shell on a golf ball. The molded shell encapsulated the compressible core.

Various RFID readers are also presented herein. The RFID readers include RFID reader antennas and RFID reader transmitters. Sometimes reference is simply made to transmitter and receiver, without making reference to the RFID reader or RFID tag, because the context enables one with ordinary skill in the art to distinguish between and RFID reader Tx/Rx and the RFID tag Tx/Rx.

The illustrative RFID reader antennas presented herein are generally associated with a golf driving bay in a golf driving range. A golf driving bay is an area that is used by a player for hitting golf balls in a golf driving range. Generally, a golf driving range has a plurality of "bays" and these bays may be on a ground level or may be stacked on top of one another in a multi-level golf driving range.

Figure 1A:
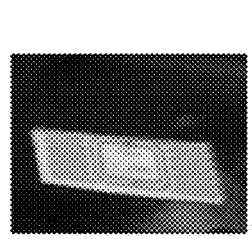
FIG. 1A shows an RFID tag with an inlay.

Referring to FIG. 1A, there is shown and RFID tag inlay 10. The RFID tag generally includes a graphic overlay and an inlay, with the RFID tag inlay being the functional part of the RFID tag 10. The RFID tag inlay 10 includes an RFID integrated circuit (IC) 12 or "chip" that is used to carry the coded information and an antenna 14 that is used to transmit and receive RF signals.

As described in further detail below, the RFID tag 10 is received by an RFID golf ball with a customized molded impression. Additionally, the RFID tag 10 may be disposed between a split core or slug In the illustrative embodiment, the RFID tag includes an omnidirectional antenna that operates in the ultra-high-frequency (UHF) range. Additionally, the illustrative RFID tag can be encapsulated in a flexible substrate that is disposed between the spherical golf ball core and a spherical golf ball shell.

By way of example and not of limitation, the illustrative RFID tag 918 operates at the 860 MHz-960 MHz, and the size of the internal chip is 0.2 mm by 0.2 mm. The illustrative flexible substrate or "carrier" may be composed of PVC, Teslin, urethane or any such flexible material.

Figure 1B:
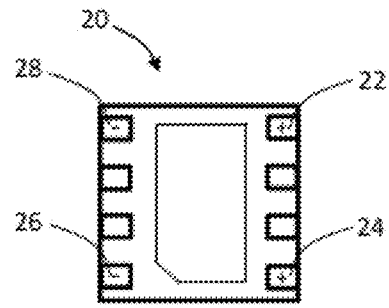
FIG. 1B shows an encapsulated RFID tag with contacts.

An alternative to the RFIG tag 10 is the encapsulated RFID tag 20 shown in FIG. 1B. The illustrative encapsulated RFID tag 20 includes contact pads 22, 24, 26 and 28 that are electrically coupled to an antenna (not shown in FIG. 1B). By way of example and not of limitation, the illustrative RFID chip is a Monza 4 Dura chip from Impinj.

The illustrative Monza 4 Dura chip is in a packaged format with a ruggedized tag design that includes the encapsulated RFID chip with a rigid material, e.g. an epoxy. The illustrative Monza 4 Dura is supported by a standard PCB surface mount assembly technique and is encased in an 8-pin μDFN package that accommodates surface mount assembly. The illustrative operating frequency is between 860-960 MHz. The package length is approximately 2 mm, width is 2 mm, and height is 0.50 mm. By way of example and not of limitation, pins 8 and 4 provide input pads for a first antenna that is isolated from the RF input pads for a second antenna that utilizes pins 1 and 5 as the input pads.

Figure 1C:
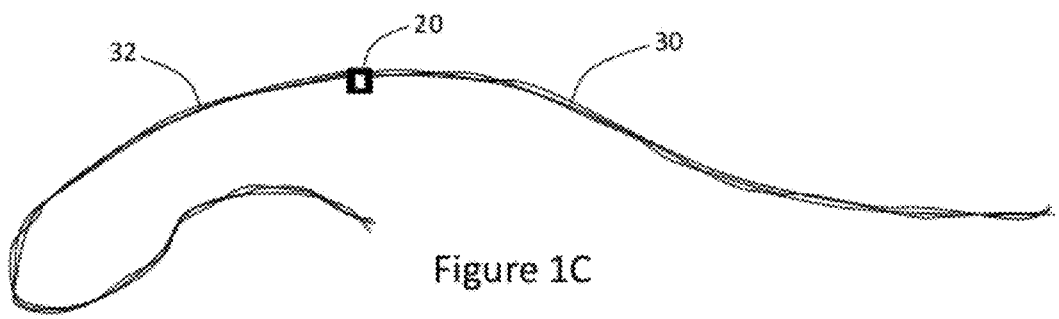
FIG. 1C shows the encapsulated RFID tag with an antenna

FIG. 1C, there is shown the encapsulated RFID integrated circuit with conductive wires that operate as an antenna. In the illustrative embodiment, the Monza 4 Dura chip is integrated with a compressible golf ball core as described herein. More particularly, the encapsulated RFID integrated circuit 20 is coupled to conductive wires 30 that are electrically coupled to contacts 22, 24 and conductive wires 32 are electrically coupled to contacts 26 and 28.

Figure 1D:
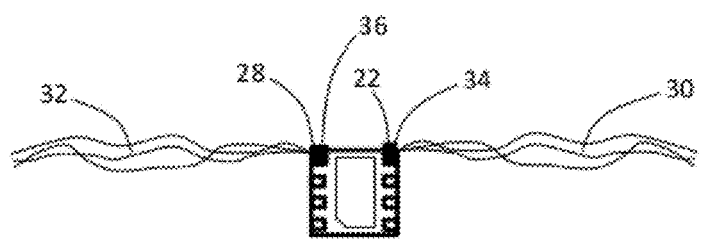
FIG. 1D shows an exploded view of encapsulated RFID tag in FIG. 1C.

FIG. 1D shows an exploded view of encapsulated RFID integrated circuit in FIG. 1C, in which the conductive wires 30 and 32 are electrically coupled to contacts 22 and 28, respectively. The conductive wires 30 and 32 are electrically coupled to contacts 22 and 28 using a material 34 and 36, respectively. The materials 34 and 36 may be either conductive materials, non-conductive materials or a combination thereof. The illustrative encapsulated RFID tag shown in FIGS. 1C and 1D are then integrated into an golf ball as described in further detail below.

Figure 2:
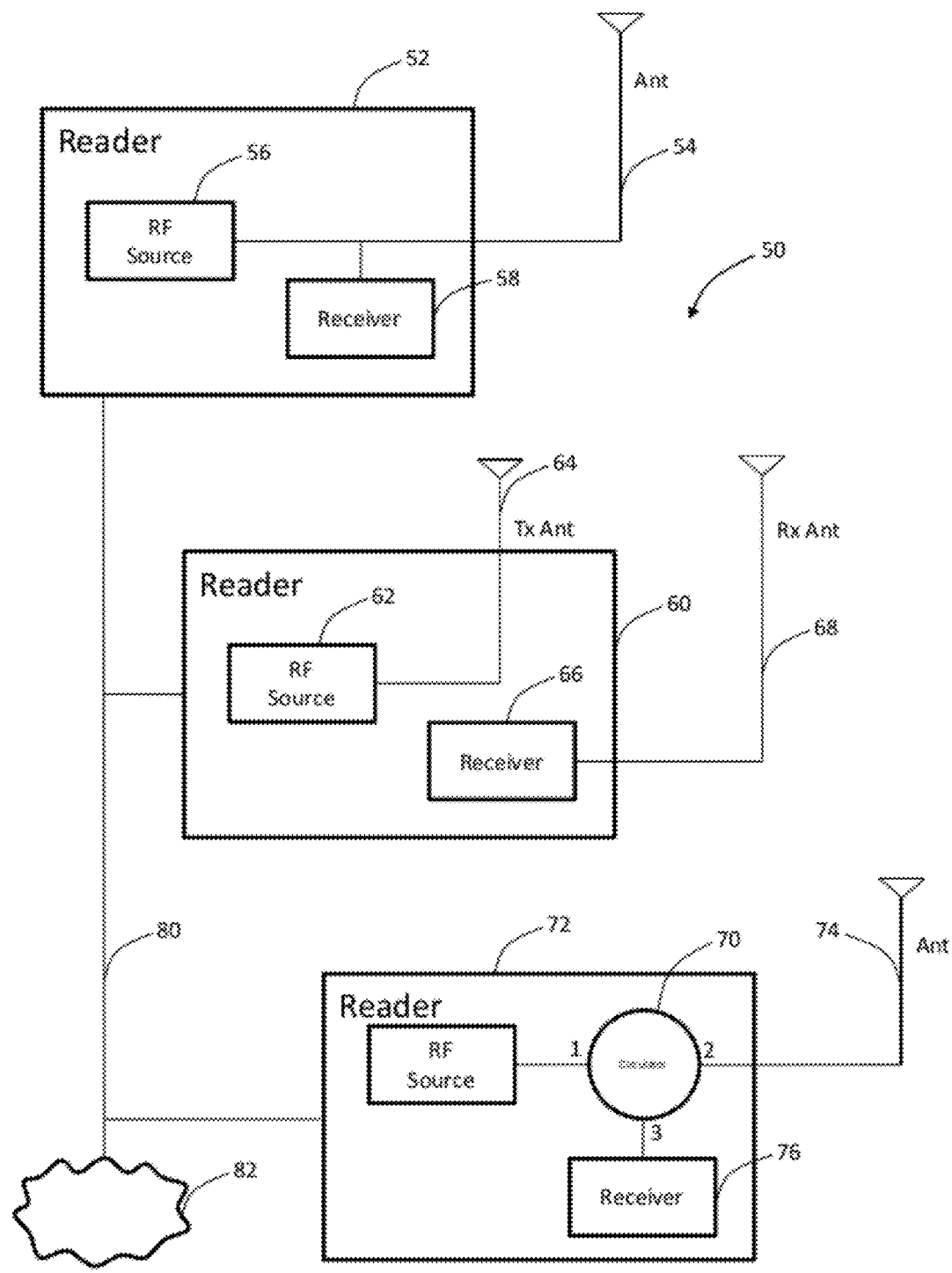
FIG. 2 shows networked RFID readers.

Referring now to FIG. 2, there is shown a plurality of networked RFID readers that interrogate the RFID tags described above. The interrogation is commonly accomplished by arranging the RFID tags to listen for an interrogation message and to respond with a unique serial number or other such information. The RFID tags typically have limited power available for transmitting data wirelessly to the reader.

By way of example and not of limitation, a reader operates in a backscatter mode and the RFID tags operate using the power of the received signal from the reader to transmit. The illustrative reader is configured to have a high transmission power and high sensitivity to backscattered signals from the RFID tags.

Generally, there are two types of reader systems; bistatic systems and monostatic systems. A bistatic system uses different antenna for transmission and reception, and the antennas are sufficiently separated in space to have fewer isolation problems.

A monostatic system uses the same antenna, or collocated antenna, for transmission and reception. When the same antenna is used for both transmission and reception, a monostatic system may use only half of the number of antenna that is used in a bistatic system and cover the same area. However, a monostatic system typically requires lots of tuning to isolate the transmit power and the receiver. In a typical RFID system, the transmit power of a reader may be around a watt or two, while the receiver may be expected to be sensitive to signals at microwatt levels.

Conventional RFID readers are typically designed to use one of three general approaches to transmit signals to and receive signals from one or more tags. These approaches include a single channel homodyne technique, a two-antenna bistatic technique, and a circulator device.

Illustrative RFID reader 52 uses a homodyne receiver. A homodyne receiver refers to a single channel for both the transmitted signal and the received signal and a direct down conversion of the data to baseband. The reader 52 has a single antenna 54 electrically coupled to both a RF source 56 and a receiver 58.

The illustrative reader 60 is a bi-static system with separate antennas that are used for transmit and receive. For example, the RFID reader 60 has a radio frequency source 62 coupled to its transmit antenna 64 and a receiver 66 coupled to receive antenna 68 that receives signals.

A circulator 70 is used to separate the incoming signal (receive) from the outgoing signal (transmit), and couples the powers in a preferred direction so the receiver retains backscatter information and the transmitter powers the tag. For example, the reader 72 includes a circulator 70 that couples power in a preferred direction, forward for transmit and power, and to the receiver 76 for the receive or reflected portion. Power to the tag passes through to the antenna 74, and received power from the RFID tag is channeled toward the receiver block 76 after being reflected by the tag. The circulator 70 couples port 2 to port 1 to transmit signals and couples port 2 to port 3 to receive signals.

The illustrate readers 52, 60 and 72 are communicatively coupled to a network 82 with illustrative Ethernet cables 80.

In one embodiment, the RFID reader of the RFID ball reading system is disposed above ground along a vertical plane. In another embodiment, the RFID reader is disposed along a horizontal plane.

In the illustrative embodiment, each RFID reader is communicatively coupled to a plurality of antennas that correspond to a particular golf driving bay. Additionally, RFID readers are networked and communicate RFID data with a central database.

Additional embodiments for the RFID reader systems are presented in patent application Ser. No. 13/277,940 entitled RFID GOLF BALL TARGET SYSTEM AND METHOD, which is hereby incorporated by reference in its entirety.

Figure 3A:
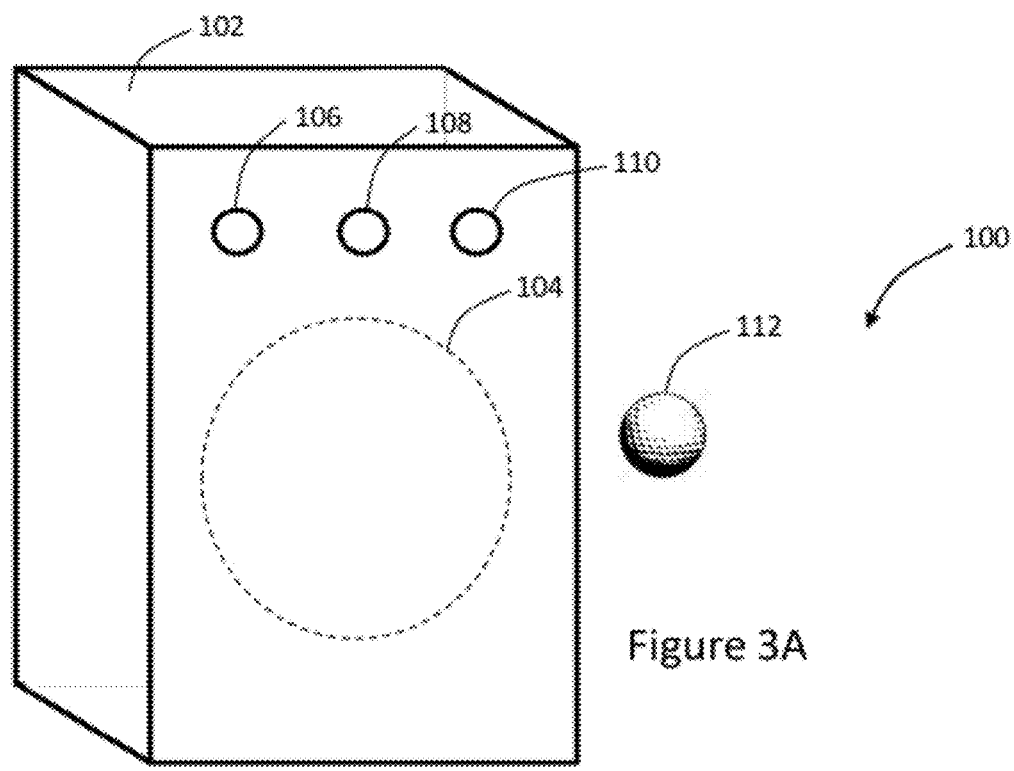
FIG. 3A and FIG. 3B show an RFID reader in a vertical plane.
Figure 3B:
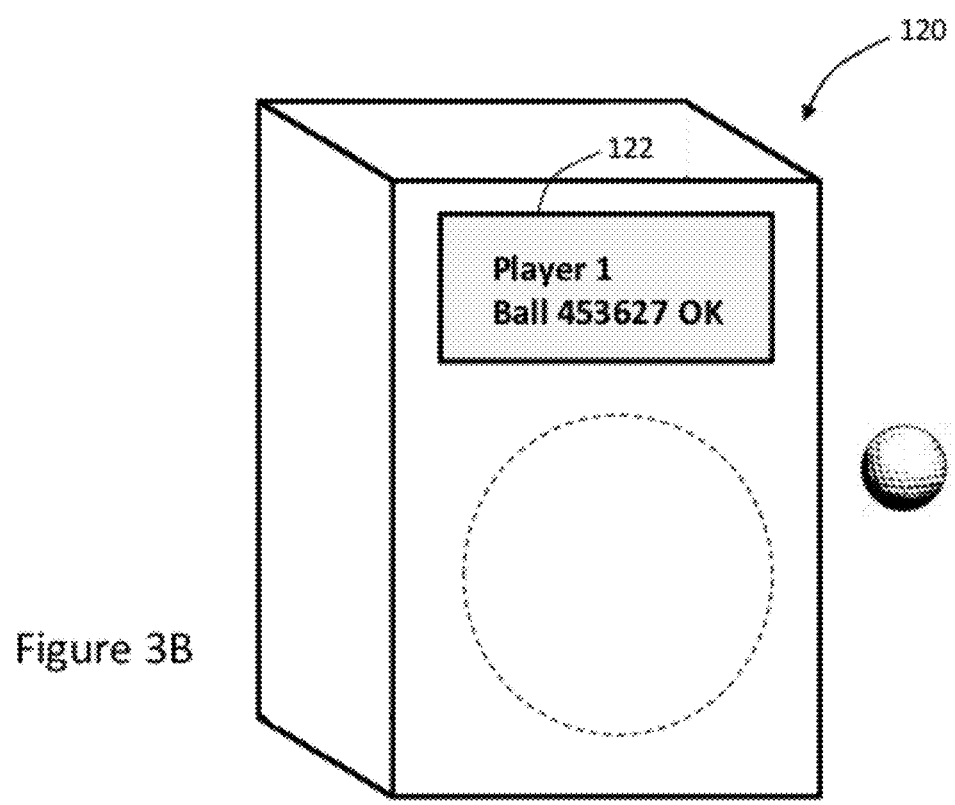

Referring to FIGS. 3A and 3B there is shown two illustrative tee ball validators 100 and 120, respectively. The tee ball validators 100 and 120 are configured to operate as RFID readers positioned in a vertical plane and are configured to read RFID golf balls along a vertical axis. A tee area (as described in FIG. 4 below) has a hitting surface on which the RFID golf ball is placed before it is hit by the golf club. The illustrative tee ball validator 100 or 120 positioned near the tee area. The tee ball validator 100 or 120 validates the RFID golf ball before it is struck by the player and associates that RFID golf ball with the player.

Illustrative tee ball validator 100 includes an enclosure 102, an RFID transmit and receive antenna 104, multiple visual indicators, 106, 108, 110, and associated electronic components as described herein. The illustrative antenna (not shown) within the enclosure 102 is an antenna 104 that is designed to detect RFID tags. The RFID reader 100 is operatively coupled to a processor or controller (not shown) that provides the detection logic, which identifies the unique identifier signal embedded in the RFID golf ball 112. In operation the RFID reader or tee ball validator 100 then forwards the unique identification number to an application processor (not shown) associated typically with a server (not shown). The RFID reader 100 communicates with a local area network using an illustrative Ethernet based system. The illustrative server runs an illustrative relational database management system that validates the player and the RFID golf ball. The tee ball validator 100 communicates with the illustrative server and receives instructions that control a player display that provides information to the player. The illustrative player display may include visual indicators 106, 108 and 110 that may be associated with colors red, orange and green. These visual indicators present information to the player about a particular game.

The server that runs the application program for validating the RFID golf ball and validating the player may be located in a centralized location so communications for a plurality of tee ball validators can be centrally managed and controlled.

Before striking an RFID golf ball, the player must register the RFID golf ball with the system. Registration of the RFID golf ball is performed by passing the RFID golf ball in front of the RFID antenna which reads at least one unique identifier associated with the RFID golf ball.

If the RFID reader is identified as a valid RFID golf ball that is within the database. The ball is then associated with the player in that position or golf bay and the indicators are changed to let the player know that the ball is registered and ready to be hit toward the target.

If the tee ball validator is configured in the manner of FIG. 3A, the communication with the player would be to activate an indicator specifying that the ball is registered and ready for play. As an example, one of the available indicators might be green, indicating that a valid ball has been detected and successfully registered to the player. The player would then drop the ball onto the hitting surface and hit it toward the target. If the ball does not register correctly at the tee ball validator, then the player must choose another ball before playing.

Other indicators maybe activated to alert the player that a valid ball has been detected but that the identity of the player in that position is not known, or that some other error has been detected. In an alternative form of the tee ball validator, shown in FIG. 3B, the set of visual indicators is replaced by a visual display 122. This could be a small video screen imbedded in the device, or a remotely positioned monitor, mobile computing device or other communication medium.

Figure 4:
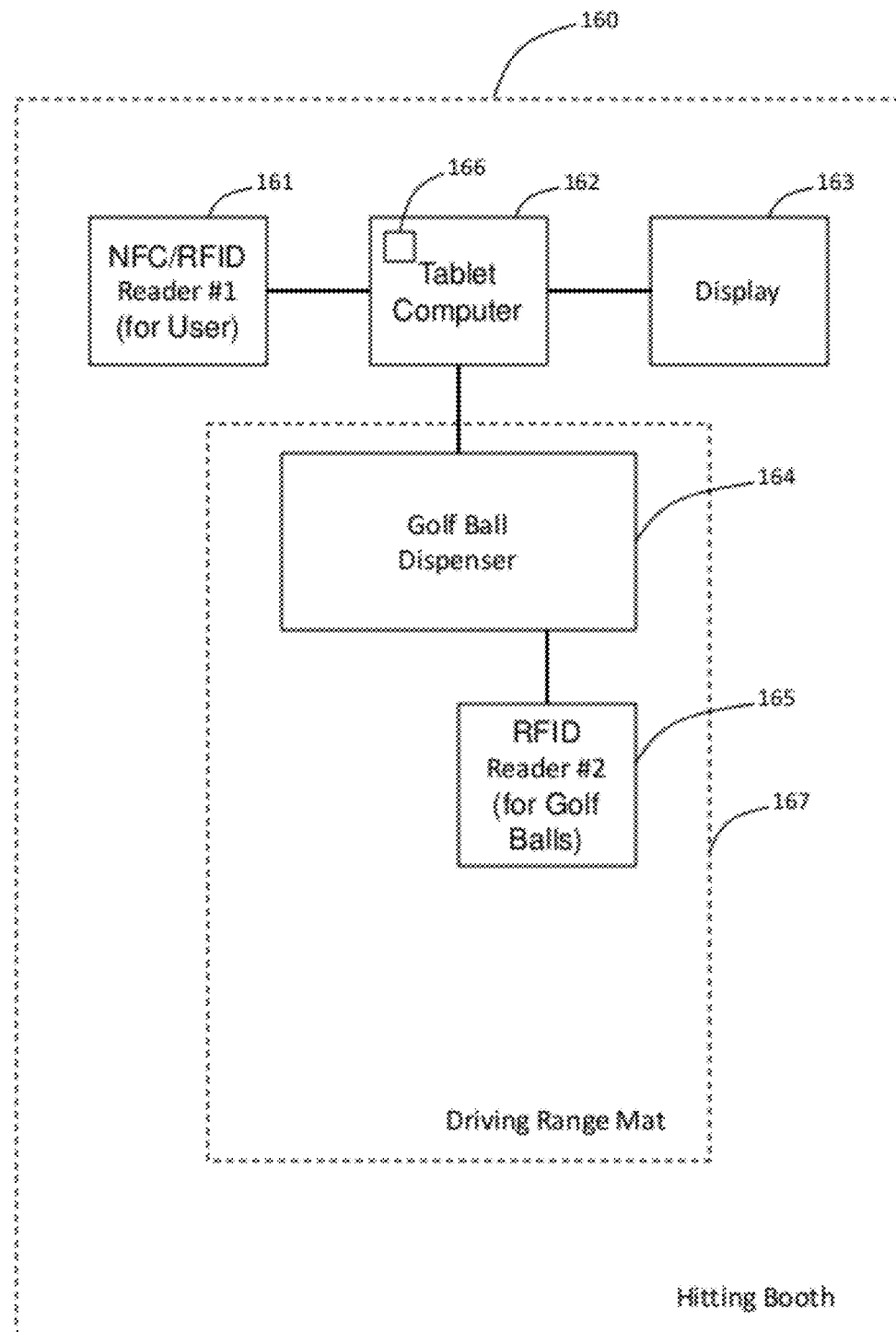
FIG. 4 shows system components in an illustrative golf driving range hitting booth.

Referring to FIG. 4 there is shown an illustrative system of components in an illustrative golf driving range hitting booth or golf driving bay. Note, the terms "driving range hitting booth" and "golf driving bay" are used interchangeably for purposes of this patent. The illustrative hitting booth 160 includes a scanner 161, a client computer 162, a display 163, a golf dispenser 164 and an RFID reader 165. The illustrative scanner 161 is a Near Field Communications (NFC) reader or an RFID reader for a membership card with an RFID tag. The illustrative scanner reads an electronic device (not shown) that is associated with the particular player. The illustrative electronic device may be a wireless handset or RFID card associated with the particular player.

After the scanner 161 reads the player's electronic device, an identification (ID) number associated with the player's electronic device is activated in a centralized database (not shown), and the illustrative tablet computer 162 and display 163 present the player information. The illustrative client computer 162 is a tablet computer such as an iPad® manufactured by Apple Inc. Display 163 is a much larger and presents the player information to other players in proximity of the hitting booth 160.

In operation, a player enters the golf driving range hitting booth 160. On an illustrative client computer 162, such as an iPad® tablet computer mounted to a support column (not shown) on one side of the booth, the player scans his or her electronic device, such as a Near Field Communications (NFC) device or a membership card with an RFID tag, with the scanner 161. The electronic device identifies the particular player. More players can join the game at the hitting booth or via a gaming server from different booths or site locations, thereby allowing for other players from other locations to play against one another.

After the player selects a game using tablet computer 162, an RFID golf ball is dispensed from golf ball dispenser 164. In the illustrative embodiment, a golf ball with an UHF omnidirectional RFID chip is dispensed on to a driving range mat by golf ball dispenser 164. A more detailed description of the RFID golf ball is provided below. When the golf ball dispenser 164 dispenses the RFID golf ball, the RFID reader 165 with an RFID near field read (NFR) antenna reads the RFID golf ball. The RFID reader 165 is communicatively coupled to a network having a server that receives the RFID golf ball information. More particularly, the unique ID from the RFID tag in the RFID golf ball is read and inserted into a database table that contains the logged-in user ID. After the golf ball rolls onto the driving range mat, the golf ball is hit by the player.

The illustrative client computer 162 includes a touch screen display that allows a player to interact with a game selection module 166. The game selection module 166 includes at least one game of skill, in which an award is provided when the RFID golf ball associated with the player ID is read by the target RFID reader that is associated with the capture area. By way of example and not of limitation, the award may be a predetermined number of points based on the distance and size of the capture area.

An alternative embodiment, the game selection modules 166 includes at least one game of chance, in which a game session for the game of chance is initiated when the RFID golf ball associated with the player ID is read by the target RFID reader, a random result for the game session is generated, and a paytable associates a prize with the random game session result. The awarded prize is then displayed to the player.

In another embodiment, the game selection module 166 includes a game that has both a first game of skill component and a second game of chance. The embodiment starts with the player, by way of example and not of limitation, hitting the ball in the target area and getting points, and a subsequent game of chance, i.e. spinning a wheel for additional points. In operation, a first award is initially provided when the RFID golf ball is received by the capture area. This first award is based on the player's skill in hitting the ball at the appropriate target. The player then has the opportunity to play a second game of chance. By way of example and not of limitation, the second game may be referred to as a bonus game, in which the bonus game is a game of chance, where the player gets to spin a wheel. The random prize corresponding to the spinning wheel is then awarded to the player. Alternative games of chance include reels in a slot machine, virtual scratcher, bingo card, lottery game or other such graphic representation of a game of chance.

In another game embodiment, after a predetermined number of misses by the player, e.g. after 20 balls have been hit but none landed in the target area, the game session for the game of chance is initiated. Therefore, the player can continue to play the game and win points, even if he or she lacks the skill necessary to hit the golf ball into the target.

Figure 5A:
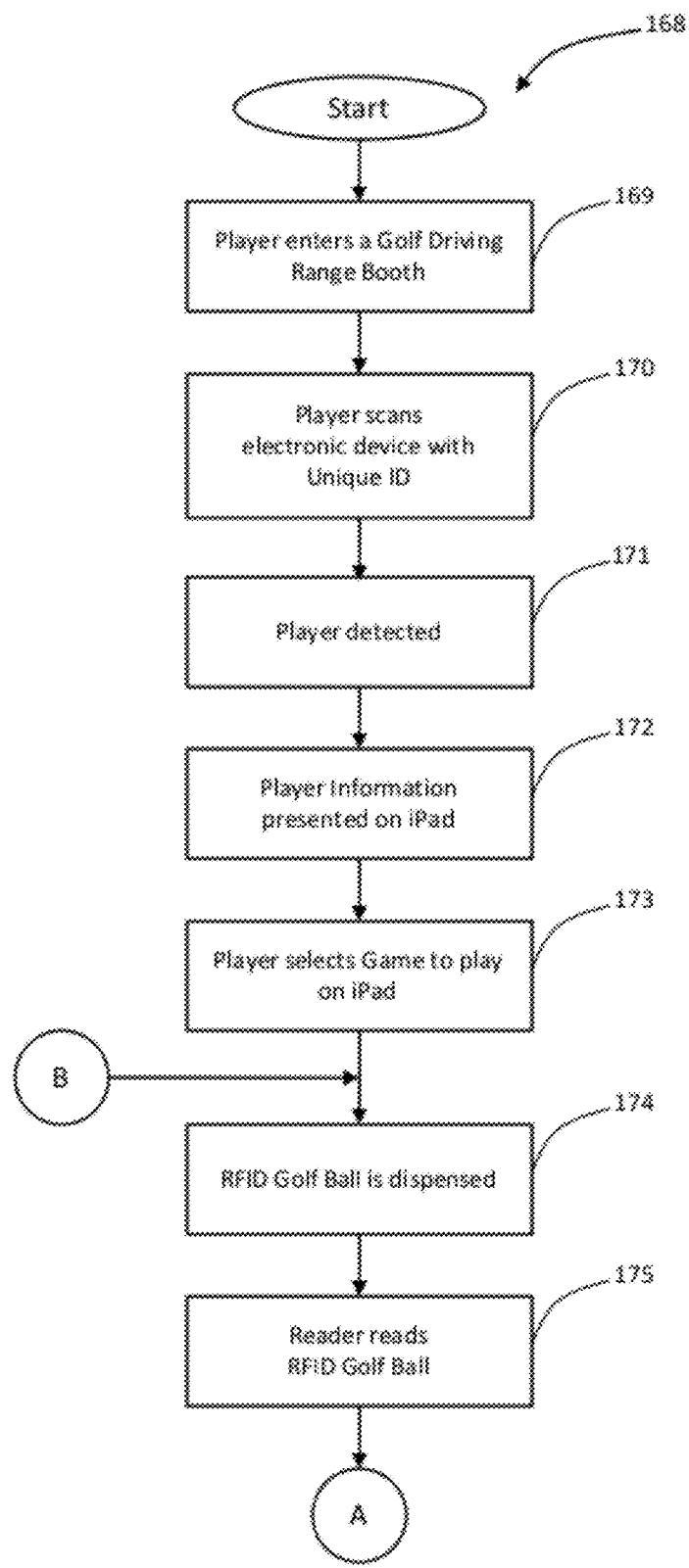
FIG. 5A shows a first portion of an illustrative method for operating an RFID golf ball range target system.

In FIG. 5A, there is shown a first portion of an illustrative method 168 for operating an RFID golf ball range target system. The method is initiated at block 169, when the player enters a golf driving range booth. At block 170, the player scans an electronic device with a unique ID and the player is detected at block 171. Player information is presented at block 172. The player then proceeds to select a game to play on a tablet computer as described in block 173. At block 174, the RFID golf ball is dispensed and the reader reads the RFID golf ball at block 175.

Figure 5B:
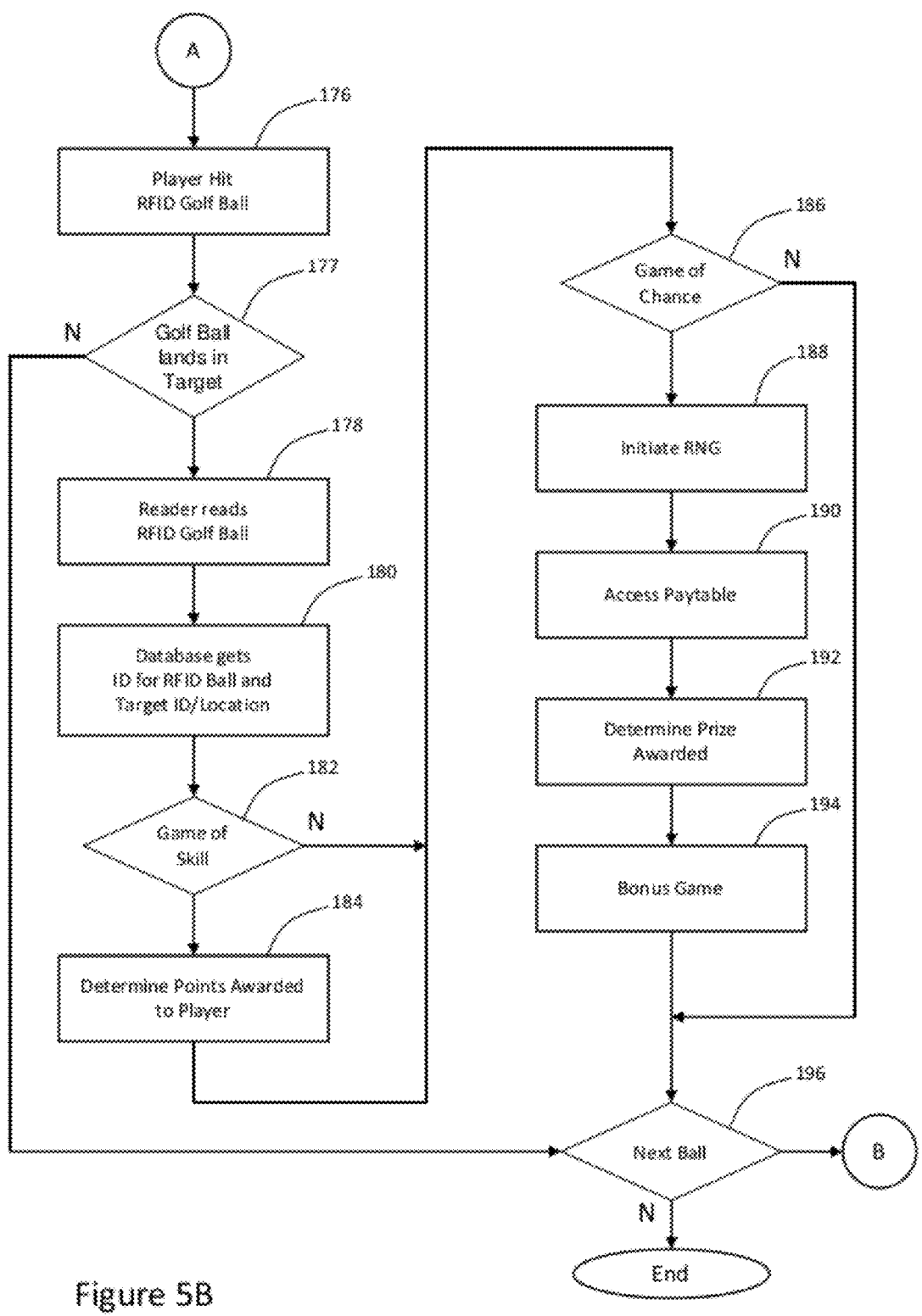
FIG. 5B shows a second portion of the illustrative method for operating the RFID golf ball range target system.

FIG. 5B shows a continuation of the illustrative method 168 for operating the RFID golf ball range target system. At block 176, the player hits the RFID golf ball. The method then proceeds to decision diamond 177, where a determination is whether the golf ball hit the target area. If the golf ball lands in a target, the RFID golf ball is channeled into another RFID NFR antenna and RFID reader computer that is connected to the network as described in further detail below.

If the RFID ball does not land in the target area, then the method proceeds to decision diamond 196, where a new golf ball may be dispensed and zero (0) points are awarded for the missing the target area.

At block 178, the target RFID reader(s) read the RFID golf ball. The golf balls unique tag ID is read from the golf ball and the location of the target's ID is sent to the database.

At block 180, the database gets the ID for the RFID ball and Target ID/location. The golf unique ID is searched for and if the ball ID is found allocated to a current logged in player, a database point list algorithm determines the points for that target and an action is triggered.

At decision diamond 182, a determination is made whether a game of skill has been initiated. If a game of skill has been initiated, an amount of points is awarded to a player at block 184. In the illustrative embodiment, points associated with a particular target, player ID and game session are associated with the appropriate database fields.

At decision diamond 186, a determination is made whether a game of chance has been initiated. In first game of chance embodiment, when the RFID golf ball lands in a target, a slot machine reel spins on the tablet client computer 162 and display 163 at the players hitting booth 160. The awarded points are then calculated in the database for that player and posted to the player's displays, on a web site and various displays throughout the facility (like a leader board).

In another game of chance embodiment, an illustrative random number generator is initiated is initiated at block 188. At block 190, the appropriate paytable is accessed for the particular game of chance. The prize that is awarded according to the paytable is determined at block 192. At block 194, an illustrative bonus game is initiated.

At decision diamond 196, a determination is made whether to play the next ball. The database of points for the active player is then displayed in a game format on the tablet and display at the hitting booth, on a web site and various displays throughout the facility (like a leader board).

Referring to FIG. 6, an illustrative driving range 200 having movable targets is shown. Tee area 202 has tee boxes numbered #1 through #8. A player enters one of the tee boxes and hits a golf ball from the tee box onto the target area 204, with the objective of hitting a ball into one of the movable targets. Movable targets 206, 208, and 210 are shown. The arrows shown adjacent to the targets indicate that the targets are movable. Any of the targets may be relocated to any position on the target area 204.

The movable targets include at least one enclosed boundary capture component having a top boundary edge, a bottom boundary edge, and a tapering surface material that joins the top boundary edge to the bottom boundary edge. By way of example and not of limitation, the tapering surface material may be composed of a plastic UV resistant material. The shape of the enclosed boundary components can include curved sectors or segments that are connected to one another resulting in a variety of different sizes and shapes. Thus, the shape of the enclosed boundary capture component is determined by engineering and design constraints.

If the player is aiming for target 208, the player will be awarded a point value for landing a ball in exterior funnel 212. A higher point value is awarded for landing the ball in inner funnel 214. The highest point value for target 208 is awarded when the player is able to land a ball in innermost funnel 216. In one embodiment, the target is a fixed target and includes RFID antennas under turf such as Astroturf. The RFID antennas are then associated with a particular RFID reader.

Referring to FIG. 7A-7D, there is shown a planar molded impression in a molded compressible core 220 that receives an RFID tag. The RFID tag 222 includes an RFID integrated circuit with a memory as described above that includes at least one unique identification number. The RFID tag 222 also includes an RFID antenna electrically coupled to the RFID integrated circuit.

In FIG. 7B, a compressible core 224 is shown. Additionally, a portion of molded shell 226 for the RFID golf ball is also shown. A molded impression 228 is configured to receive the RFID tag inlay 222, as shown in FIGS. 7C and 7D. The molded flexible core has a center and a spherical surface. Additionally, the molded impression receives the inlay material with the antenna and RFID integrated circuit. In this embodiment, the molded impression 228 is a planar slot disposed in the center of the molded flexible core. More generally, the planar slot receives a planar inlay material, e.g. RFID tag inlay 222, which includes an antenna electrically coupled to the RFID integrated circuit. In FIG. 7D, there is also shown a fill material 230 that is used to fill any gaps in the molded impression that receives the RFID tag inlay 232.

One of the most important elements of the RFID tag inlay is the selection of the adhesive. In one embodiment, the antenna may be electrically coupled to the RFID integrated circuit with an anisotropic conductive adhesive. Additionally, the antenna may be electrically coupled to the RFID integrated circuit with a non-conductive adhesive.

In operation the RFID golf ball 220 is read by an RFID ball reading system that includes an RFID reader as described in FIGS. 2-5 and FIG. 13.

A method for embedding an RFID tag begins with an extruded slug 232 being placed in a core mold tray that includes a mold 234 as shown in FIG. 7E. The mold 234 includes a lower mold portion 236 and an upper mold portion 238. The upper mold portion 238 further includes a planar projection 240. The slug is a compressible compound that is heated to generate the compressible core of the golf ball.

By way of example and not of limitation, the planar projection 240 leaves a molded impression that has an Illustrative size of 30 mm deep×9 mm wide×0.5 mm high. In operation, the planar projection 240 may be a heated metallic projection that is blade-shaped. After the core has cooled, the RFID tag inlay is inserted into the molded impression.

After the compressible compound in the mold is heated and the mold is removed, the planar projection 240 leaves the planar molded impression 228. The RFIG tag inlay 222 is then placed in the molded impression. A fill material is then applied that fills the molded impression occupied by the RFID tag inlay 222. The molded flexible core 224 is then encapsulated with a molded shell, which is the cover of the golf ball.

After the RFID chip is placed in the slot, there may be a need for a filler material to be included. The filler material may be rubber like. Additionally, the material such as use teslin (which is 60% air) may be used a s filler material.

Various engineering constraints that affect the design of the RFID golf ball include selection of the integrated circuit or "chip" characteristics such as memory, processor, performance, price, and how the chip and the antenna are electrically coupled, including RFID tag inlay or packaged die with soldered leads as described below.

In the illustrative embodiment, the RFID tag inlay includes an integrated circuit or "chip" or "die" and an antenna. The antenna may be composed of aluminum, copper, or silver and is bonded to a polyethylene terephthalate (PET) layer that is delivered to the label maker "dry" (without adhesive) or "wet" (attached to a pressure sensitive liner). The inlay is adhered to the back side of the label and printed and encoded in an RFID printer.

Adhesive materials can be used to attach dies onto antenna to build the inlays. In one embodiment, an interconnect adhesive is used to attach a small bare die directly to an antenna. In another embodiment, an interconnect adhesive is first used to build a much larger packaged die, which is then adhered onto an antenna. Both methods of assembly have been successfully employed to make RFID tags.

Generally, the RFID tag may also include a "carrier" or "substrate" on which the chip and antenna are disposed. The carrier or substrate may include an adhesive. For example, anisotropic conductive adhesives can be used to attach bare dies to antenna substrates. Anisotropic conduct in only one direction and is filled with small amounts of electrically conductive particles. Nonconductive adhesives may also be used to attach small dies on to to an antenna, in which die bumps are directly connected to the antenna pads using mechanical means. The nonconductive adhesive provides structural support and increases tag reliability.

Referring to FIG. 8A-8B, there is shown a curved molded impression in a compressible core 250 that receives an RFID inlay tag 252. The circular molded impression 254 is disposed in the center of the molded flexible core 250. The curved molded impression 254 receives the curved RFID inlay tag 252 that includes a curved antenna electrically coupled to the RFID integrated circuit.

The molded impression 254 may also be a cylindrical slot disposed in the center of the molded flexible core. The cylindrical slot 254 receives a curved inlay material that includes a curved antenna electrically coupled to the RFID integrated circuit. A fill material (not shown) fills the cylindrical slot 254. Generally, the fill materials has material properties that are similar to the compressible core material.

Referring to FIG. 8C, there is shown a cylindrical projection 256 in a top mold portion 258. The cylindrical projection 256 leaves a cylindrical mold impression 254 that is filled with an RFID inlay tag 252 and the appropriate fill material.

In FIG. 8D, there is shown a curved projection 260 that is associated with a top mold portion 262. The curved projection 260 generates a curved mold impression 254 that is configured to receive the RFID inlay tag 252. Additionally, a fill material may be used to occupy any remaining space in the curved mold impression 254.

Referring to FIGS. 9A-9C, there is shown various RFID tags that are sandwiched between a split compressible core as shown in FIG. 9D. In FIG. 9A there is shown an RFID tag 300 that includes an RFID integrated circuit 302, a first conductive wire 304 and a second conductive wire 306. There is no substrate or carrier in FIG. 9A. The conductive wires 302 and 304 may be a single conductive wire or may include multiple stranded wires. In FIG. 9A, there is no inlay and the wires are shown in a top view, so the combination of the RF integrated circuit and conductive wire(s) is along a plane that can be disposed between a top hemisphere 310 and bottom hemisphere 312 presented in FIG. 9D.

Referring now to FIG. 9B, there is shown an RFID tag 320 that includes an RFID integrated circuit 322, a first conductive wire 324, a second conductive wire 326, and a carrier or substrate 328. The conductive wires 324 and 326 may be a single conductive wire or may include multiple stranded wires. In FIG. 9B, there is a carrier that is coupled to the conductive wires 324 and 326 as a dry inlay (no adhesive) or as a wet inlay (with adhesive). FIG. 9B presents a top view so the combination of the RF integrated circuit and conductive wire(s) are along a plane that can be disposed between the top hemisphere 310 and bottom hemisphere 312 presented in FIG. 9D.

Referring to FIG. 9C, there is shown an RFID tag inlay 330 that includes an RFID integrated circuit 332, a printed antenna 334, and a carrier 336 that are coupled together as a dry inlay or as wet inlay. By way of example and not of limitation, the carrier material may be composed of a very light substrate such as a low-density or high-density polyethylene compound. FIG. 9C presents a top view of the RFID tag inlay that is placed between the top hemisphere 310 and bottom hemisphere 312 presented in FIG. 9D.

The RFID tag sandwiched between the top hemisphere 310 and the bottom hemisphere 312 is then placed in a mold (not shown) that includes a lower tray (not shown) and upper tray (not shown). The mold is then heated and the top hemisphere 310 and bottom hemisphere 312 are melted so that the appropriate RFID tag inlay (300, 320 or 330) is encased within a newly pressed spherical compressible core that is then encased or encapsulated by a dimpled molded covering or shell.

In each of the split core embodiment, after the RFID chip has been sandwiched between hemispheres, the combination of half cores, RFID chip, and antenna are then placed in the appropriate mold and reheated. The reheat temperature is dependent on material properties of the core, the RFID chip, the antenna, and the carrier. For illustrative purposes, reheat is performed at 130° C.-204° C. and depends on the amount of applied pressure. In a narrower embodiment, the reheat temperature of 204° C. (400 F) is applied for 15-25 minutes.

Alternatively, a slug as shown in FIG. 7E above may be split into two sections and the carrier material having the RFID chip and antenna disposed thereon can be sandwiched between the two slug sections. The split slug with the sandwiched RFID tag may then be placed in a mold that is heated to form a compressible core with an embedded RFID tag.

Referring to FIG. 10A-10E, there is shown a molded impression that receives an encapsulated RFID tag at the center of the compressible core. More particularly, in FIG. 10A there shown a side view of a molded impression 402 that extends to the center of the compressible core 404. A molded shell 406 further encapsulates the compressible core 404. The illustrative molded impression 402 includes a round hole 408 that extends to the center of the core 404. Additionally, the molded impression includes side wings 410a and 410b that are adjacent to the round hole 408.

Figure 10A:
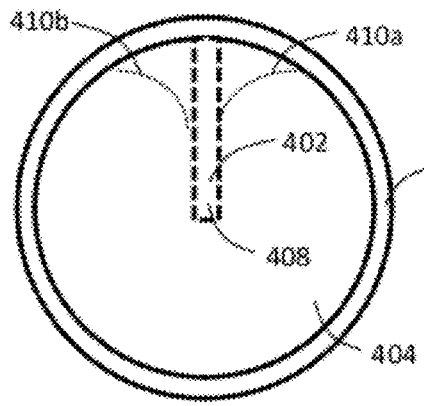
FIGS. 10A-10E show a molded impression that receives an encapsulated RFID tag with conductive wires at the center of the core.
Figure 10B:
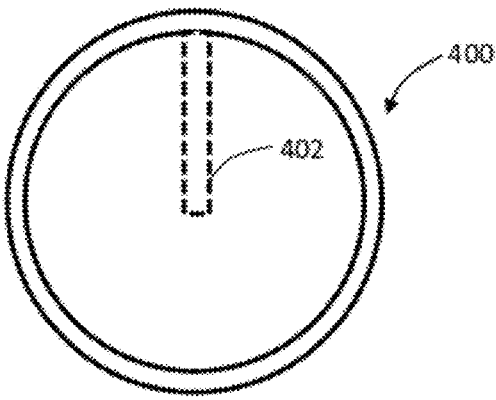

In FIG. 10B, another side view is presented that is 90° from the FIG. 10A. In this second side view, the side wings 410a and 410b and the round hole 408 associated with molded impression 402 are in the same plane.

Figure 10C:
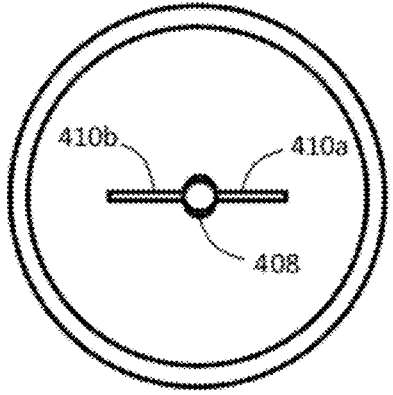

In FIG. 10C, a top view is presented of the molded impression 402 that includes the rounded hole 408 and side wings 410a and 410b.

Figure 10D:
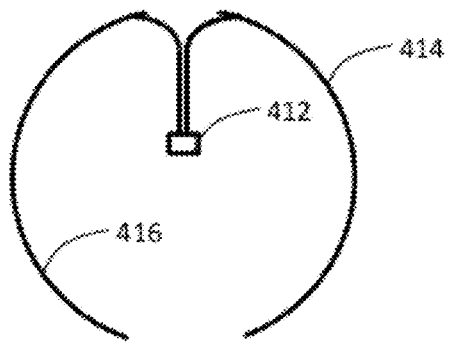
Figure 10E:
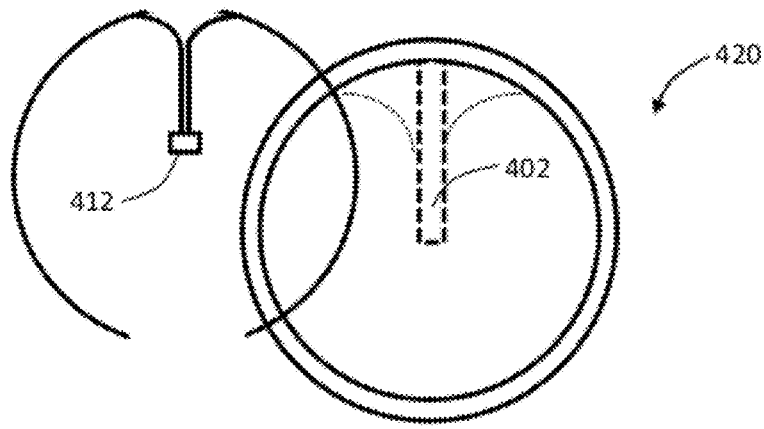

FIG. 10D presents an encapsulated RFID integrated circuit 412 that is electrically coupled to antenna 414 and 416. The RFID chip 412 fits into the center of the molded impression 402 as shown in FIG. 10E. The antennas 414 and 416 interface the side wings 410a and 410b, respectively. An adhesive is applied to the RFID chip 412 so the chip is fixedly coupled to the center of the compressible core. The antenna 414 and 416 may be single conductive wire or a plurality of stranded wires that are braided.

During manufacturing, a filler material is applied to fill any gaps in the molded impression 402. The molded shell 406 is then applied. The resulting RFID golf ball 420 has the benefit of having the chip in the center and dampening the impact of being hit by a golf club, and the curved antenna does not possess any sharp turns thereby minimizing breaking the antenna.

Figure 11E:
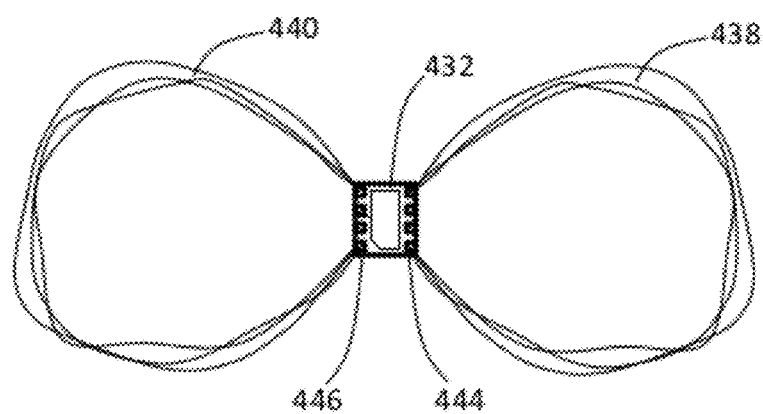

Referring to FIGS. 11A-11F, there is shown another embodiment with an RFID integrated circuit disposed on the surface of a compressible core. FIG. 11a presents a top view of a ruggedized RFID integrated circuit 432 located within a molded impression on the surface of compressible core 436. The RFID integrated circuit includes contactless pads (not shown) or "leads" that are soldered to conductive wires 438 on a first side, and conductive wires 440 on an opposite side that operate as antennas. Additionally, a non-conductive material such as an epoxy can be used to further join or better secure the soldered side of the RFID package to the antennas 438 and 440.

Referring to FIG. 11B, there is shown a side view of the RFID integrated circuit 432 on the surface of the compressible core 436. A portion of an exterior molded shell 442 is also visible. The conductive wires 438 and 440 are shown to extend approximately half way along the surface of the compressible core 436.

By way of example and not of limitation, the RFID integrated circuit 432 is a Monzan RFID chip or Monza Dura, which is packaged in a ruggedized tag packaged format with leads as shown above in FIG. 1B. The Monza Dura is an Impinj chip that is a fully EPC global-compliant, high-performance, Monza-powered tag with printed circuit board (PCB) applications and enabled ruggedized tag design.

Figure 11F:
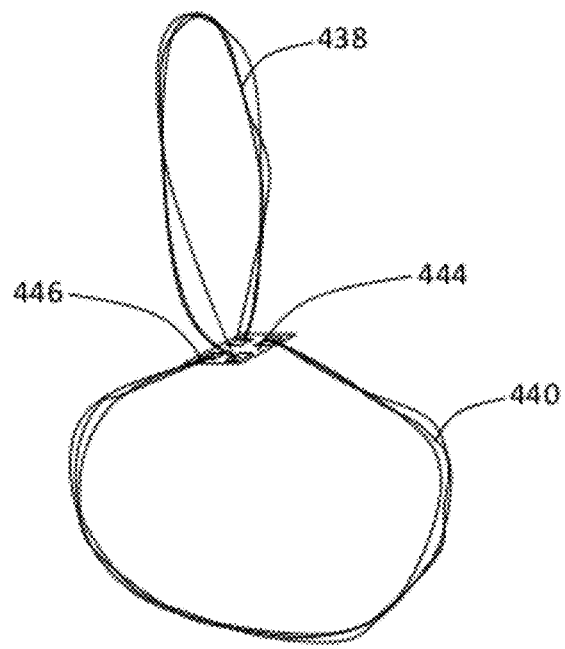

In the illustrative embodiment, the antennas 438 and 440 are soldered to RFID package leads in a wire pattern shown in FIGS. 11C and 11D,and a loop pattern shown in FIGS. 11E and 11F. The conductive wires or antennas may be a single wire or a plurality of stranded wire. In the illustrative embodiment, the plurality of stranded wires is a braided wire that may be used to lessen the chance for a fatigue failure of a single-wire antenna.

In FIG. 11C, the illustrative RFID chip 432 includes a plurality of contacts pads such as contact 450. Contact 450 has a relatively small footprint of approximately 0.3 mm by 0.3 mm. This relatively small footprint has to be electrically coupled to antennas 438 and 440. The antennas 438 and 440 are composed of conductive wire. By way of example and not of limitation, the conductive wire is a fine copper wire having a diameter of approximately 0.03 mm. The illustrative braided wire can be more generally referred to as stranded wire. Stranded wire is more flexible than solid wire of the same cross-sectional area. Additionally, stranded wire provides hire resistance to metal fatigue.

The illustrative RFID chip 432 is encased in dual flat no (DFN) lead style of packaging that has no pins or wires, but uses contact pads instead. The illustrative material encasing the RFID chip 432 is a rigid material such as a polyamide epoxy material with the contacts 450 exposed.

The antennas and chips are matched so as to optimally function at appropriate frequencies and generally only at the tuned frequency. The most common frequencies are low frequency (LF), high frequency (HF) and ultra high frequency (UHF).

In FIG. 11C the antennas 438 and 440 are configured as a dampened waveform, in which the amplitude of the sinusoidal waves decrease as a function of the distance from the RFID chip 432. In FIG. 11D, the antennas 438 and 440 are configured as a waveform, in which the amplitude of the sinusoidal waveforms remain constant as a function of the distance from the RFID chip 432. In both embodiments shown in FIGS. 11C and 11D, the conductive wires or antennas 438 and 440 may be single conductive wire or multiple stranded wires that may be braided.

In FIGS. 11E and 11F two different "figure-eight" embodiments are shown. More particularly, in FIG. 11E there is shown a planar embodiment where the ends of the conductive wires 438 terminate at on the same side 444 of the RFID chip 432; and on the opposite side 446. The conductive wires 440 terminate on the same side 446.

In FIG. 11F, a first end of the conductive wire 438 is electrically coupled to one of the contact pads on side 444 and the second end of conductive wire 438 is coupled one of the contacts pads on the opposite side 446. Additionally, the ends of conductive wire 440 also terminate on side 444 and 446. The resulting "figure-eight" is not planar, and although with the appropriate molded impression the RFID chip may reside on the surface of the compressible core 436, this figure-eight embodiment may also be located in the center of the compressible core 436.

Figure 12A:
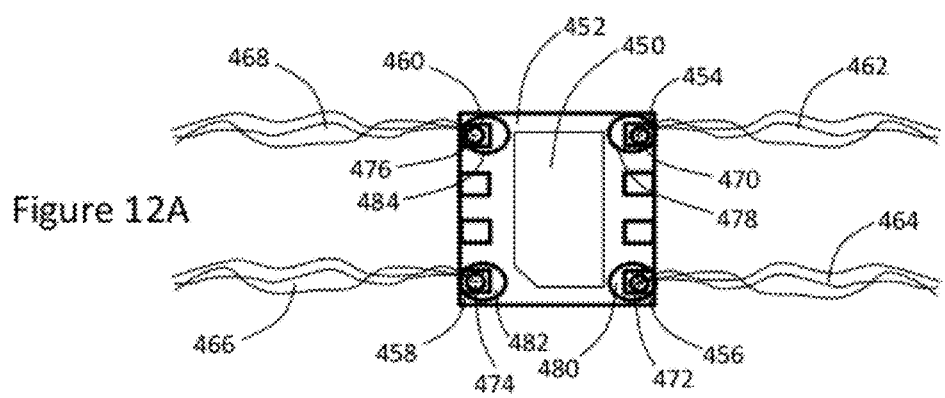
FIGS. 12A-12D show a thicker wire disposed between the conductive antenna wires and the encapsulated RFID integrated circuit.

Referring to FIGS. 12A-12D there is shown an exploded view of an encapsulated RFID chip joined or fixedly coupled to at least one conductive wire. In FIG. 12A, the illustrative RFID chip 450 is shown to be packaged in a secondary protective package 452 or "encapsulation material" that is then connected to an antenna as described herein.

Alternatively, the RFID chip 450 may mounted on a circuit board that is then communicatively coupled to an antenna (not shown). For example, RFID chip 450 may be mounted on a circuit board and have enhanced mechanical, electrical and thermal performance.

The selection of the encapsulation material may be dependent on the amount of vibration that is necessary to dampen the impact the golf club hitting the golf ball. By way of example and not of limitation, a material with a high dampening capacity may be silicon or include a silicon-based material. Thus, the encapsulation material may be silicon based and flexible. Alternatively, the encapsulation material may be more rigid, i.e. have a low dampening capacity, and for illustrative purposes is a polyamide epoxy.

After the RFID chip 450 is placed in the secondary protective package 452, the chip 450 is connected to an antenna. In FIG. 12A there is shown an exploded view of a plurality of stranded wires joined to the contact pads 454, 456, 458 and 460. For illustrative purposes, the remaining contact pads are not operable and are not electrically coupled to the RFID chip 450.

The contact pads 454, 456, 458 and 460 are each fixedly coupled to antennas 462, 464, 466 and 468, respectively, with a solder, i.e. conductive material. The solder material 470, 472, 474 and 476 joins the conductive wire or wires to the contact pads 454, 456, 458 and 460, respectively. The illustrative solder material may be 96% Sn and 4% Pb. Alternatively, the solder may include silver at 7%. By way of example, the tensile stress on the on the solder joint may be approximately 15 psi.

Additionally, the solder may be combined with a non-conductive material such as an epoxy resin that can further absorb the impact of the golf club striking the golf ball. By way of example and not of limitation, the epoxy resin dots 478, 480, 482 and 484 cover the each of the contacts that have been soldered to the conductive wires.

The illustrative antennas 462, 464, 466 and 468 are composed on one or more copper wires. The plurality of conductive wires is also referred to as stranded wires. In the illustrative embodiment, the stranded wires are be intertwined or braided.

Figure 12B:
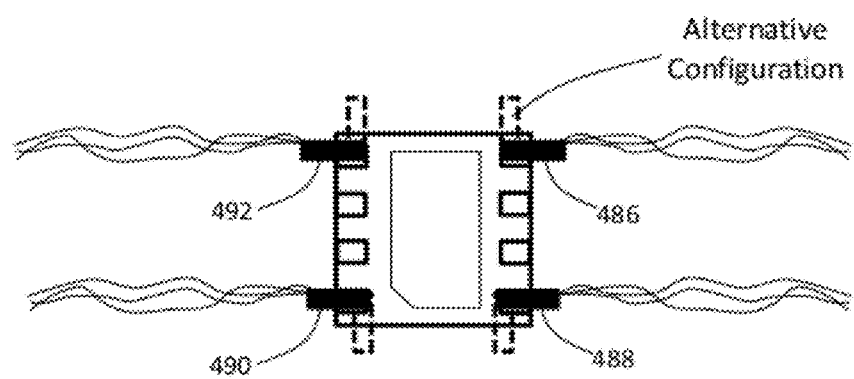
Figure 12C:
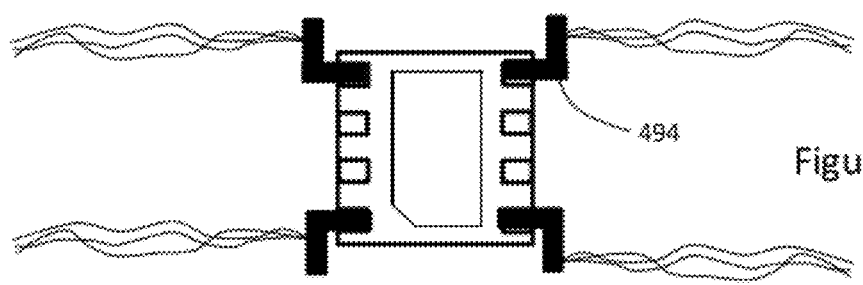
Figure 12D:
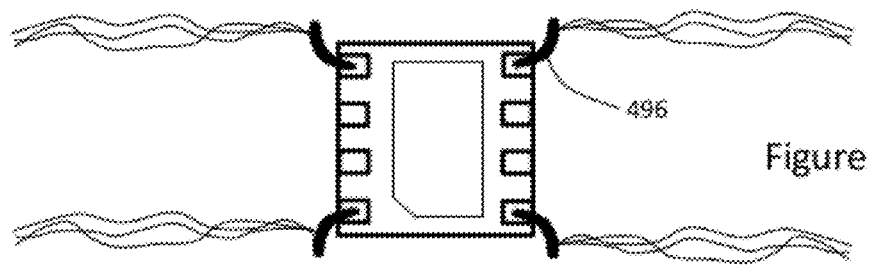

Referring to FIG. 12B, there is shown an exploded view of the encapsulated RFID chip 450, in which the contacts 454, 456, 458 and 460 are first electrically coupled to a thicker wire 486, 488, 490 and 492 that interfaces with the contact pads. The thicker wire 486, 488, 490 and 492 are shown in two configurations. In each configuration, the thicker wires 486, 488, 490 and 492 increase the surface area of the contact pads, thereby simplifying the welding process and providing greater surface area for a non-conductive adhesive. In FIG. 12C, a stamped thicker wire 494 is shown having a 90° angle. And in FIG. 12C, the thicker wire 496 is curved. After the thicker wires shown in FIGS. 12B-12D are joined to the contact pads 454, 456, 458 and 460, the conductive wires 462, 464, 466, and 468 are then fixedly coupled, i.e. joined, to the thicker wires.

An alternative to the conductive wires described above includes the use of conductive ink instead of conductive wires. The conductive ink can be printed directly on compressible ball or on to a carrier medium that is then joined to the compressible ball. The conductive ink may be composed of materials such as graphene, silver flakes, nanoparticles and other such materials. By way of example and not of limitation, silver flake ink can be purchased from DuPont and requires a binder to bind the silver flakes.

In each of the embodiments described above, the tensile stress, tensile strain, and elasticity also affect the RFID integrated circuit, antenna, and means for joining the RFID integrated circuit to the antenna, e.g. a solder joint. Thus, depending on the material properties of the encapsulating material for the RFID chip, the material properties of the solder joint, e.g. stress on the solder, must also be considered. Additionally, the solder may also be combined with other materials such as an epoxy resin. The combination of materials affects the stress and strain at each solder joint, and the elastic modules corresponding to the solder joint. Thus, the engineering design is dependent on the material properties of the material encapsulating the RFID chip, the contacts on the RFID chip, the antenna wire, and solder joint that fixedly couples the antenna wire to the RFID chip contacts.

Referring now to FIG. 13, an illustrative system diagram 500 for the golf range target system is shown. In the illustrative embodiment, the player obtains a set of RFID golf balls dispensed by a golf ball dispenser such as that shown at 100 or 120 in FIG. 3. An issuing area RFID reader 502 may be a component of the golf ball dispenser, or may be located elsewhere at the driving range. The RFID golf balls are placed in or dispensed to an indicated designated area proximate to the issuing area RFID reader. Each RFID golf ball has a unique identification stored on the RFID transponder embedded within the ball. The issuing area RFID reader reads the unique identification from each of the plurality of balls. The issuing area RFID reader is communicatively coupled to an issuing area network communications module 514. The network communications module is a transmitter which sends a signal to another device on a network. The network may be, for example, a local area network or wide area network. The identification of each RFID golf ball in the player's set of RFID golf balls as detected by the issuing area RFID reader 502 is sent to server 504 via issuing area first network communications module 514. The server creates an entry in database 506 associating the identifications of the plurality of RFID golf balls with a unique identification associated with the player. The server and database may be located on site at the driving range. In some embodiments, the server or database or both the server and the database are located off site and receive communications from the RFID readers over, for example, a LAN or WAN. The server and database may be located in the same physical computer. Alternatively, an on-site server may be configured to communicate with an off-site server and database. Multiple databases may be used in conjunction with the one or more servers located on-site, off-site, or both. A multiple-site driving range establishment may use multiple servers to allow information to be collected from and distributed to the multiple sites.

The database may be configured to store additional information associated with a player including, but not limited to, a record of the player's play history at the driving range, transactional information, and account information. The player ID and other information associated with the player may be stored on a card having a magnetic stripe or other readable media. Alternatively, the player may be issued a PIN number or username and password combination associated with the player ID. In some embodiments, a temporary player account is created for short term use of the driving range. The player may receive a paper voucher indicating a temporary player ID in human readable and/or barcode form. A paperless system for issuing a temporary player ID may involve communicating the player ID to the player visually or audibly, or associating a particular tee box with the player's set of RFID golf balls.

At the tee area, the player removes a ball from the set of RFID golf balls and places it on a tee in preparation for hitting the ball onto the driving range. The identification of the individual golf ball is obtained by tee area RFID reader 508 and sent to server 504 via a tee area network communications module 516 communicatively coupled to the tee area RFID reader. The communication of an RFID golf ball identification from the tee area network communications module to the server may occur when the ball is placed on the tee (on arrival at the tee area), or when the ball is hit off of the tee (on departure from the tee area). In some embodiments, the identification of the RFID golf ball is communicated when the ball is placed on the tee and again when it is hit from the tee area.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A ball apparatus comprising:
a compressible core that includes,
an RFID integrated circuit that includes a memory configured to store at least one unique identifier;
a planar flexible substrate carrier material configured to receive the RFID integrated circuit on a planar surface thereof;
an RFID antenna electrically coupled to the RFID integrated circuit, the RFID antenna being planar and circular, the RFID antenna disposed on the flexible substrate carrier material;
the flexible substrate carrier material with the RFID antenna and the RFID integrated circuit coupled to a compressible material.

2. The ball apparatus of claim 1 further comprising a molded shell that encapsulates the joined carrier material and the compressible material.

3. The ball apparatus of claim 1 wherein the RFID antenna is electrically coupled to the RFID integrated circuit with a conductive material.

4. The ball apparatus of claim 1 wherein the RFID antenna is electrically coupled to the RFID integrated circuit with a non-conductive adhesive.

5. The ball apparatus of claim 1 wherein the compressible material comprises a slug that is placed into a mold, which is then subjected to heating to form the compressible core.

6. The ball apparatus of claim 1 wherein the compressible material comprises a spherical core that has been split into a top hemisphere and a bottom hemisphere, wherein the carrier material is sandwiched between the hemispheres and is then placed in a mold that joins the top hemisphere, the carrier material and the bottom hemisphere.

7. The ball apparatus of claim 1 wherein the RFID antenna includes a conductive wire electrically coupled to the RFID integrated circuit.

* * * * *